United States Patent [19]

Elrod et al.

[11] Patent Number: 5,417,186

[45] Date of Patent: May 23, 1995

[54] DUAL-ACTING APPARATUS FOR VARIABLE VALVE TIMING AND THE LIKE

[75] Inventors: Alvon C. Elrod, Clemson; Michael T. Nelson, Greenville, both of S.C.

[73] Assignee: Clemson University, Clemson, S.C.

[21] Appl. No.: 83,640

[22] Filed: Jun. 28, 1993

[51] Int. Cl.[6] ............................................. F01L 1/04
[52] U.S. Cl. ............................. 123/90.17; 123/90.31; 74/568 R; 464/2
[58] Field of Search ............... 123/90.15, 90.17, 90.31; 74/640, 665 K, 665 L, 438, 568 R; 464/2, 160

[56] References Cited

U.S. PATENT DOCUMENTS

| | | |
|---|---|---|
| 733,220 | 7/1903 | Krebs . |
| 862,448 | 8/1907 | Cornilleau . |
| 1,527,456 | 2/1925 | Woydt et al. . |
| 1,815,134 | 7/1931 | Weiner et al. . |
| 2,057,354 | 10/1936 | Withers et al. . |
| 2,888,837 | 6/1959 | Hellmann . |
| 2,906,143 | 9/1959 | Musser . |
| 2,959,065 | 11/1960 | Musser . |
| 3,496,918 | 2/1970 | Finlay . |
| 3,516,394 | 6/1970 | Nichols . |
| 3,633,555 | 1/1972 | Raggi . |

(List continued on next page.)

FOREIGN PATENT DOCUMENTS

| | | |
|---|---|---|
| 0324500 | 7/1989 | European Pat. Off. . |
| 517937 | 5/1921 | France . |
| 1109790 | 2/1956 | France . |
| 704575 | 4/1941 | Germany . |
| 727987 | 11/1942 | Germany . |
| 1924114 | 11/1970 | Germany . |
| 2747884 | 5/1979 | Germany . |
| 2921645A | 12/1980 | Germany . |
| 3041864A | 5/1982 | Germany . |
| 3212663A | 10/1983 | Germany . |
| 3234640A | 3/1984 | Germany . |
| 47-50884 | 12/1972 | Japan . |
| 1587842 | 4/1981 | United Kingdom . |
| 2066361A | 7/1981 | United Kingdom . |
| 2165885A | 4/1986 | United Kingdom . |

OTHER PUBLICATIONS

"Variable Valve Timing for IC Engines," Automotive Engineer, vol. 10, #4, Aug.-Sep., 1983.
Ma, SAE Paper No. 880390, "Effect of Variable Engine Valve Timing on Fuel Economy," 1988.
Scott, D., "Variable Valve Timing Has Electronic Con-
(List continued on next page.)

Primary Examiner—Henry C. Yuen
Assistant Examiner—Weilun Lo
Attorney, Agent, or Firm—Dority & Manning

[57] ABSTRACT

An apparatus and method effects the cyclical actuation of an actuation member. The apparatus can be driven by a crankshaft and has at least one dual-acting phasing apparatus with at least three rotatable mounted internally splined members and at least a first rotatably mounted, externally splined, flexible member having a portion thereof rotatably disposed within each of at least two of the internally splined members. One inner splined member can be connected nonrotatably to a first rotatable member such as an inner shaft, which is rotatably disposed within an outer shaft of a concentric camshaft. Another internally splined member can be nonrotatably connected to the outer shaft. Yet another internally splined member can be nonrotatably connected to a pulley wheel driven by the crankshaft. A fourth internally splined member can be connected to one of the other three internally splined members. A second externally splined, flexible member can be disposed with a portion thereof rotatably disposed within each of at least two of either the three or four internally splined members. Various configurations of cam members and camlobe members can be disposed as integral portions of the inner shaft and the outer shaft. The cam members can be fixed or variable, full width cam members or splittable cam members. More than one concentric camshaft can be controlled by a single dual-acting phasing mechanism. More than one dual-acting phasing mechanism can be used to control two camshafts, concentric or conventional.

26 Claims, 15 Drawing Sheets

U.S. PATENT DOCUMENTS

| | | | |
|---|---|---|---|
| 3,682,152 | 8/1972 | Muller-Berner . | |
| 3,814,069 | 6/1974 | Croft et al. . | |
| 3,905,340 | 9/1975 | Boyesen . | |
| 3,919,986 | 11/1975 | Goto . | |
| 3,986,351 | 10/1976 | Woods et al. . | |
| 4,180,042 | 12/1979 | Lloyd . | |
| 4,332,222 | 6/1982 | Papez . | |
| 4,356,798 | 11/1982 | Sakaoka et al. . | |
| 4,357,917 | 11/1982 | Aoyama . | |
| 4,388,897 | 6/1983 | Rosa . | |
| 4,476,823 | 10/1984 | Williams . | |
| 4,494,495 | 1/1985 | Nakamura et al. . | |
| 4,498,352 | 2/1985 | Hedelin | 123/90.17 |
| 4,517,947 | 5/1985 | Nishikawa et al. . | |
| 4,524,639 | 6/1985 | Carlson . | |
| 4,539,946 | 9/1985 | Hedelin . | |
| 4,561,390 | 12/1985 | Nakamura et al. . | |
| 4,570,581 | 2/1986 | Titolo . | |
| 4,572,118 | 2/1986 | Baguena . | |
| 4,577,598 | 3/1986 | Ma . | |
| 4,583,501 | 4/1986 | Williams . | |
| 4,587,934 | 5/1986 | Moores . | |
| 4,644,912 | 2/1987 | Umeha et al. . | |
| 4,708,029 | 11/1987 | Urano . | |
| 4,715,247 | 12/1987 | Honda et al. | 74/640 |
| 4,754,727 | 7/1988 | Hampton . | |
| 4,770,060 | 9/1988 | Elrod et al. . | |
| 4,771,742 | 9/1988 | Nelson et al. . | |
| 4,856,469 | 8/1989 | Okazaki et al. . | |
| 4,917,058 | 4/1990 | Nelson et al. . | |
| 4,974,470 | 12/1990 | Ishikawa et al. | 74/640 |
| 4,977,793 | 12/1990 | Husted . | |
| 4,993,370 | 2/1991 | Hashiyama et al. | 123/90.31 |
| 5,041,253 | 8/1991 | Husted . | |
| 5,048,366 | 9/1991 | Spanio . | |
| 5,117,784 | 6/1992 | Schechter et al. . | |
| 5,121,717 | 6/1992 | Simko et al. . | |
| 5,136,887 | 8/1992 | Elrod et al. . | |
| 5,138,985 | 8/1992 | Szodfridt et al. | 123/90.17 |
| 5,152,262 | 10/1992 | Parker | 123/90.17 |
| 5,157,832 | 10/1992 | Hughes . | |
| 5,161,429 | 11/1992 | Elrod et al. . | |
| 5,181,485 | 1/1993 | Hirose et al. | 123/90.31 |
| 5,275,138 | 1/1994 | Hotta et al. | 123/90.31 |

OTHER PUBLICATIONS trol", Automotive Engineering, vol. 92, No. 5, pp. 86–87, May 1984.

"Cam Shaft Shifter Cuts Fuel Use", Machine Design, Feb. 6, 1986, p. 46.

James H. Tuttle, "Controlling Engine Load by Means of Late Intake-Valve Closing" (SAE Paper No. 800794), 1981.

Nelson et al, "Camlobe Phasing May Be the Key to Controlling Emissions," Automotive Engineer, pp. 26–27, vol. 15, No. 3, Jun./Jul. 1990.

SAE 1982 Transactions, Section 2, vol. 91, No. 820408, pp. 1648–1662, Society of Automative Engineers, Inc., Warrendale, Pa., US; James H. Tuttle: "Controlling Engine Load by Means of Early Intake-Valve Closing".

Hara et al, SAE Paper No. 850074, "Effects of Intake-Valve Closing Timing on Spark-Ignition Engine Combustion," 1986.

Yamaguchi, J., "Experimental High Performance Engine Employs Fiber Reinforced Aluminum Connecting Rods", Automotive Engineering, pp. 97–99, vol. 92, No. 1, Jan. 1984.

"Variable Valve Actuation", Automotive Engineering, pp. 12–16, vol. 99, No. 10 Oct. 1991.

DUAL-ACTING APPARATUS FOR VARIABLE VALVE TIMING AND THE LIKE

BACKGROUND OF THE INVENTION

The present invention relates to apparatus and method for altering the relative rotational phase of two members otherwise keyed to rotate together in phase and more particularly to a dual-acting phasing apparatus and method for shifting concentric camshafts of a camshaft assembly.

As used herein, a single-acting phasing mechanism enables the period of rotation of one rotating member to be altered relative to the period of rotation of a second rotating member. Examples of single-acting phasing mechanisms include the electro-mechanical unit described in U.S. Pat. No. 4,770,060 issued to Elrod et al, which is owned by the assignee of the caption application and is hereby incorporated herein by this reference. One embodiment of this phaser uses Harmonic Drive TM brand gearing such as described in U.S. Pat. Nos. 2,906,143 and 2,959,065 and available from the Harmonic Drive Division of Emhart Machinery Group, Wakefield, Mass. Other single-acting phasing mechanisms are described in U.S. Pat. No. 4,754,727 to Hampton, U.S. Pat. No. 4,494,495 to Nakamura et al, U.S. Pat. No. 5,121,717 to Simko et al, and U.S. Pat. No. 5,117,784 to Schechter et al. The latter also describes a mechanism for phase shifting a camshaft rotating along the same axis as the phasing mechanism relative to a nonconcentric camshaft located along a different but parallel axis of rotation. The foregoing six patents are hereby incorporated into this application by this reference.

As shown in FIGS. 7, 10 and 12 of U.S. Pat. Nos. 4,771,742 and 4,917,058 to Nelson et al, which are owned by the assignee of the caption application and are hereby incorporated herein by this reference, apparatus and method for variable valve timing has included the use of two single-acting camlobe phasing mechanisms, one mounted on each opposite end of the concentric camshaft assembly for rotating the concentric shafts independently of one another. In this configuration, each of the phasing mechanisms can operate independently of the other phasing mechanism. However, configurations of some engine compartments may preclude using a single-acting phaser on each end of the shaft. Moreover, depending on the particular circumstances, it is desirable either to have mutually dependent operation of the phasing of two rotating members or independent phasing of each of two concentric camshafts.

OBJECTS AND SUMMARY OF THE INVENTION

It is a principal object of the present invention to provide an apparatus and method to shift concentric camshafts and their respective cam(s) or camlobe member(s) in the same or opposite angular directions, relative to the crankshaft, by equal or unequal angular amounts to controllably vary the portion of a cycle over which the respective cam(s) or camlobe member(s) are actuating the valves.

For example, the present invention is intended to provide an apparatus and method to achieve at least one of the following objectives:

provide the engine with the ability to use lower quality fuels;

improve fuel economy (reduce brake specific fuel consumption);

reduce engine braking effects;

reduce pumping loss associated with throttled operation;

improve volumetric efficiency and breathing;

compensate for gas inertia effects;

provide valve overlap control;

change the start of the induction process, the end of the induction process, or both;

change the start of the exhaust process, the end of the exhaust process, or both;

change dwell by changing one or both valve events;

improve torque (torque curve shaping—raising and flattening the torque curve);

vary valve timing for horsepower or load control;

improve performance;

improve/or reduce emissions, such as by reducing hydrocarbon emissions or using the relative timing of valve events to recirculate internal exhaust gas;

improve starting;

improve idle quality;

reduce knock;

reduce noise, vibration and harshness;

provide variable compression ratio control;

operate with a variable compression ratio while maintaining a constant expansion ratio;

change the start of the compression process;

provide the engine with the flexibility of being able to adjust the kind of valve timing that is necessary to approximate the Otto cycle, the Diesel cycle, the Atkinson cycle and the Miller cycle, as desired;

increase swirl;

provide for better scavenging control in turbocharged engines; and reduce turbo lag in turbocharged engines.

It is also an object of the present invention to provide an apparatus and method which is applicable to a broad spectrum of engine configurations, including engines with a single intake and exhaust valve per cylinder, engines with multiple intake and/or exhaust valves per cylinder, engines with a pushrod, engines with a single overhead camshaft, engines with dual overhead camshafts, and engines with other multiple camshaft arrangements.

A further object of the present invention is to provide an improved concentric camshaft assembly that includes two mutually rotatable concentric shafts, and to provide this improved camshaft with a dual-acting phasing mechanism which permits shifting the relative rotational phase relationship between the two rotating concentric shafts and thereby provides better performance, economy and emissions characteristics over the operating range of the engine.

A still further object of the present invention is to provide a dual-acting phasing mechanism that can be used to provide an apparatus and method to shift concentric camshafts and their respective cam(s) or camlobe member(s) in the same or opposite angular directions, relative to the crankshaft, by equal or unequal angular amounts to controllably vary the portion of a cycle over which the respective cam(s) or camlobe member(s) are actuating the valves.

Another object of the present invention is to provide a high speed, long angular adjustment range, continuously variable, dual-acting phaser mechanism which can be used to shift concentric camshafts and their respective cam(s) or camlobe member(s) in the same or opposite angular directions, relative to the crankshaft, by equal or unequal angular amounts to controllably vary the portion of a cycle over which the respective cam(s) or camlobe member(s) are actuating the valves.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

The dual-acting phasing apparatus of the present invention can be used in general in any application requiring timed rotation of shafts, which may be disposed with respect to one another in a fashion that is concentric, parallel, or non-parallel. For purposes of illustration, the dual-acting phasing apparatus of the present invention will be explained in conjunction with a concentric camshaft having an inner shaft that is rotatably disposed within an outer shaft. Actuating means are provided by various configurations of cam members and camlobe members that can be disposed as integral portions of the inner shaft and the outer shaft, as required for the particular application of the camshaft assembly. The cam members can be fixed or variable, full width cam members or splittable cam members.

To achieve the objects and in accordance with the purpose of the invention, as embodied and broadly described herein, the dual-acting phasing apparatus of the present invention includes at least three internally splined members and at least a first flexible, externally splined member having a portion thereof rotatably disposed within at least two of the separately rotatable, internally splined members. Each of the three internally splined members is a rigid member that is configured and disposed to rotate about the same axis of rotation. The first internally splined member can be connected nonrotatably to the inner shaft, while the second internally splined member can be nonrotatably connected to the outer shaft.

The crankshaft of an engine provides a means for driving the rotation of the inner and outer shafts. In accordance with the invention, a means can be provided for engaging the drive means. As embodied herein, the engaging means can include a pulley wheel.

In accordance with the present invention, a respective linking means is provided for linking each of the internally splined members for rotation in phase with its respective shaft or pulley wheel. As embodied herein, each respective linking means can include a respective collar that nonrotatably connects the respective internally splined member to its respective shaft or pulley wheel.

In further accordance with the present invention, a control means is provided to impart a controlled relative rotation between preselected ones of the three internally splined members. As embodied herein, the control means desirably includes at least a first wave generator disposed rotatably within the first flexible externally splined member. The control means also can include an electric motor having at least a first output shaft nonrotatably connected to the wave generator. The motor desirably is, but is not required to be, a stepper motor. The pulley wheel also can be nonrotatably connected to the motor housing. The control means also desirably includes an electronic control unit that can be preprogrammed to process input information provided by sensors or by the operator. Based on the input information, the electronic control unit can be preprogrammed to achieve desired results from various variable valve timing relationships.

By selecting the number of splines on each of the first, second, and third internally splined members relative to the number of splines on the first flexible externally splined member and relative to the number of splines on each other internally splined member, desirable phasing adjustments can be achieved with movement of at least the first wave generator to vary the point of engagement between the first flexible externally splined member and each of the at least three internally splined members. This basic embodiment of the present invention is hereinafter referred to as a four-element phaser because of the four splined members, three internally and one externally. The Harmonic Drive TM brand gearing such as described in U.S. Pat. Nos. 2,906,143 and 2,959,065 might be described respectively as a two-element gear or a three-element gear because of the number of externally and internally geared members in each.

One particular embodiment of the dual-acting phasing apparatus of the present invention includes three adjacent internally splined members, two flexible externally splined members, two wave generators, and either two in-line motors or a single motor housing two separate rotors and sets of windings. This embodiment is hereinafter referred to as a five-element phaser because of the five splined members, three internally and two externally. Each externally splined flexible member has a portion thereof rotatably disposed within each of two adjacent ones of the three separately rotatable, internally splined members. One wave generator is disposed inside each of the flexible externally splined members and is rotated by one of the motors or rotors.

Another particular embodiment of the dual-acting phasing apparatus of the present invention includes four adjacent internally splined members, two flexible externally splined members, two wave generators, and either two in-line motors or a single motor housing two separate rotors and sets of windings. This embodiment is hereinafter referred to as a six-element phaser because of the six splined members, four internally and two externally. Each externally splined flexible member has a portion thereof rotatably disposed within each of two adjacent ones of the four separately rotatable, internally splined members. One wave generator is disposed inside each of the flexible externally splined members and is rotated by one of the motors or rotors.

With modifications of either one or more solid camshafts or one or more concentric camshafts with moveable cam members or camlobe members, the dual-acting phasing mechanism of the present invention can be employed in push rod engines, single overhead camshaft (SOHC) arrangements, double overhead camshaft (DOHC) arrangements and other multiple camshaft arrangements, each of which can be a two-valve or a multi-valve configuration. Thus, the present invention can be employed in complex multi-valve arrangements, with varying degrees of freedom for changing relative timing of valves with respect to each other and with respect to the engine timing set by the timing of the crankshaft which drives the camshafts. In some of these embodiments, a concentric camshaft is driven by the crankshaft via a dual-acting phasing mechanism and has an inner shaft pulley wheel provided for the inner shaft and an outer shaft pulley wheel provided for the outer shaft to enable the concentric camshaft to drive a companion camshaft, depending on whether the companion camshaft is concentric or solid in configuration. In other embodiments, a companion camshaft is provided with a timing pulley wheel that enables both camshafts to be driven by the crankshaft.

The accompanying drawings, which are incorporated in and constitute a part of this specification, illustrate more than one embodiment of the invention and, together with the description, serve to explain the principles of the invention.

DETAILED DESCRIPTION OF THE PREFERRED EMBODIMENTS

Figure 1:
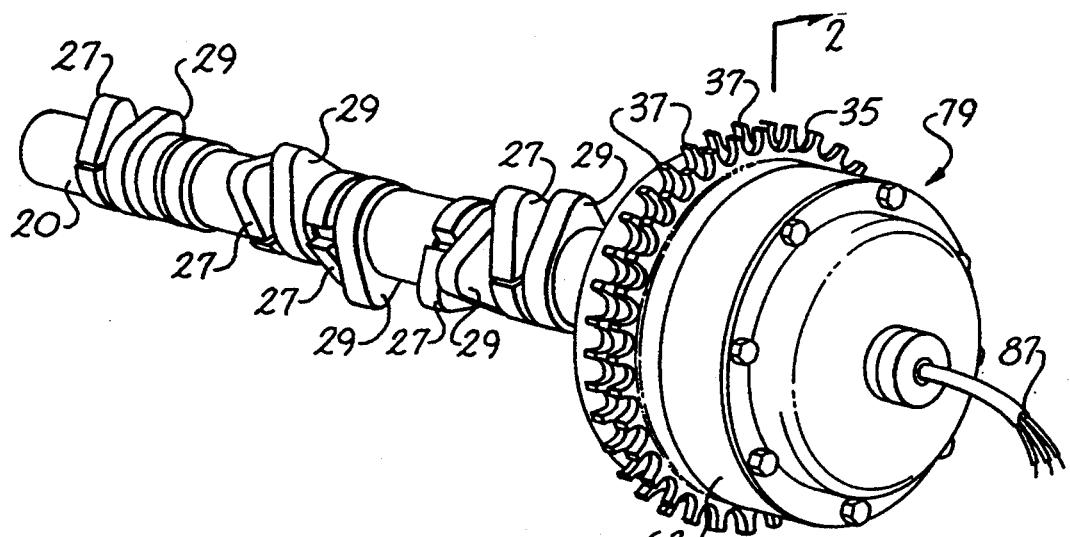
FIG. 1 is an elevated perspective view of an embodiment of the present invention.

Reference now will be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The numbering of components in the drawings is consistent throughout the application, with the same components or similarly functioning components of different embodiments having the same number in each of the drawings.

Typically, some means is provided for driving an apparatus for cyclically actuating an actuation member. As embodied herein and shown in FIGS. 9–11 and 13 for example, the drive means desirably includes the crankshaft 19 of an engine 17 (partially shown in FIGS. 5 and 6).

Figure 12:
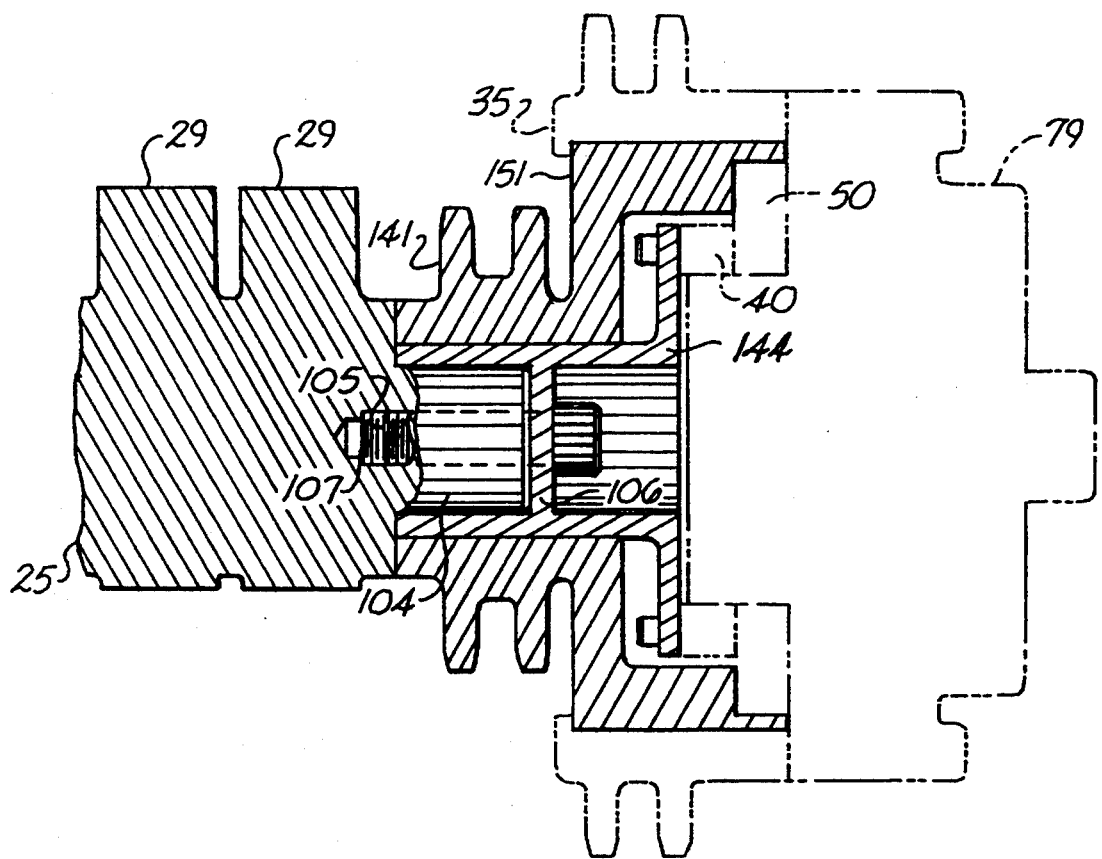
FIG. 12 is a longitudinal cross-sectional view of an embodiment of the present invention configured for a multiple shaft arrangement.

In accordance with the present invention, the apparatus for cyclically actuating an actuation member can include a first rotatable member and a second rotatable member. In embodiments involving a conventional solid camshaft, one of the first and second rotatable members can include a solid camshaft 25 as shown in FIG. 12. In embodiments involving a concentric camshaft, one of the first and second rotatable members can include an outer shaft which is rotatable about an axis of rotation. The outer shaft defines a cavity disposed along and around the axis of rotation of the outer shaft. As embodied herein and shown in FIGS. 3 and 14–17 for example, an outer shaft 20 has a centrally located rotational axis, which is schematically indicated by the occasionally broken line designated by the numeral 22. As shown in FIGS. 2, 8, 14 and 16 for example, outer shaft 20 preferably is formed as a hollow cylinder with the hollow interior forming a cavity 23 having a circular cross-section. Outer shaft 20 preferably is formed of metal or any other rigid material capable of withstanding the operating environment of shaft 20. For some applications, outer shaft 20 may be formed of a plastic or resinous material that is a poor conductor of electricity and magnetically inert.

In embodiments involving a conventional solid camshaft, the other of the first and second rotatable members can include a pulley wheel 141 as shown in FIG. 12. In embodiments involving a concentric camshaft, the other of the first and second rotatable members can include an inner shaft which is rotatable about an axis of rotation and rotatably carried within the cavity of the outer shaft. As embodied herein, inner shaft 24 has a periphery with a cross-section shaped like a polygon, such as the splined periphery shown in FIGS. 2, 3, 5, 6, 8 and 14–17. Inner shaft 24 may be tubular or solid and formed of any of the materials suitable for the outer shaft noted above. As shown in FIGS. 2, 8, 14 and 16 for example, inner shaft 24 preferably is carried concentrically about axis 22 within cavity 23 of outer shaft 20 via a plurality of bushings 18. However, as disclosed in U.S. Pat. No. 4,770,060 issued to Elrod et al and U.S. Pat. Nos. 4,771,742 and 4,917,058 to Nelson et al, inner shaft 24 could be carried within shaft 20 without bushings.

Moreover, inner shaft 24 could have a partial or full circular cross-sectional profile in an embodiment assembled differently than the embodiment illustrated in the FIGS. In addition, outer shaft 20 could comprise two sections joined around a circular inner shaft carrying a plurality of cam members integrally formed thereon as a unitary structure of the inner shaft.

The apparatus for cyclically actuating an actuation member according to the present invention further comprises a means for actuating the actuation member. The actuating means is carried by at least one of the shafts. In one preferred embodiment shown for example in FIGS. 1-3 and 14-17, the actuating means can comprise a number of full-width variable cam members 27 and full-width fixed cam members 29 appropriately disposed along the length of shafts 20, 24. The same can be said for the alternative preferred embodiments shown in FIGS. 8-11. The longitudinal relative sequence and circumferential location of the cam members 27, 29, depends on the application. The embodiments of the actuating means shown in FIGS. 1-3, 8-11, and 14-17 are suitable for many different camshaft arrangements for actuating the valves of a combustion chamber of an internal combustion engine.

Figure 5:
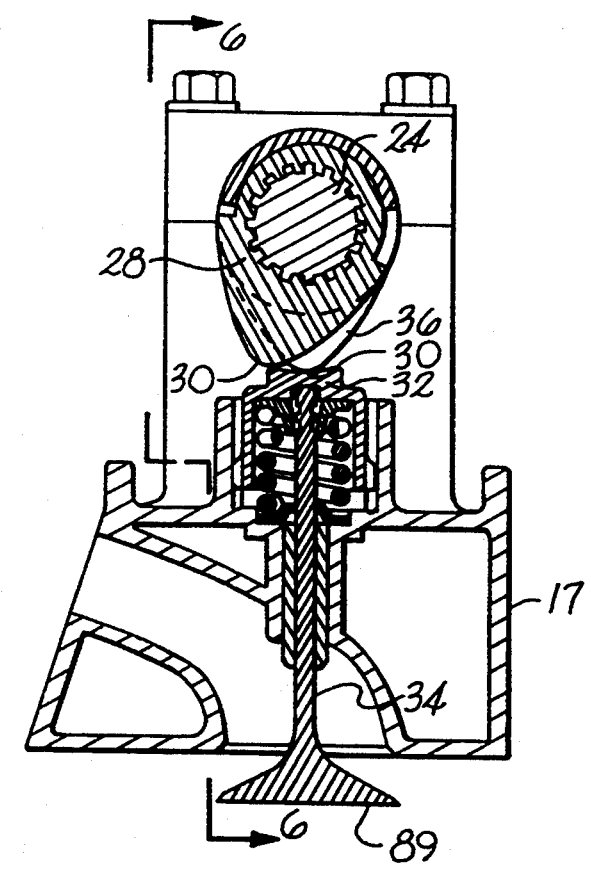
FIG. 5 is a partially-sectioned elevational view of the embodiment shown in FIG. 6 and taken along the line of sight in the same direction as the arrows pointing to the numerals 5—5 in FIG. 6.
Figure 6:
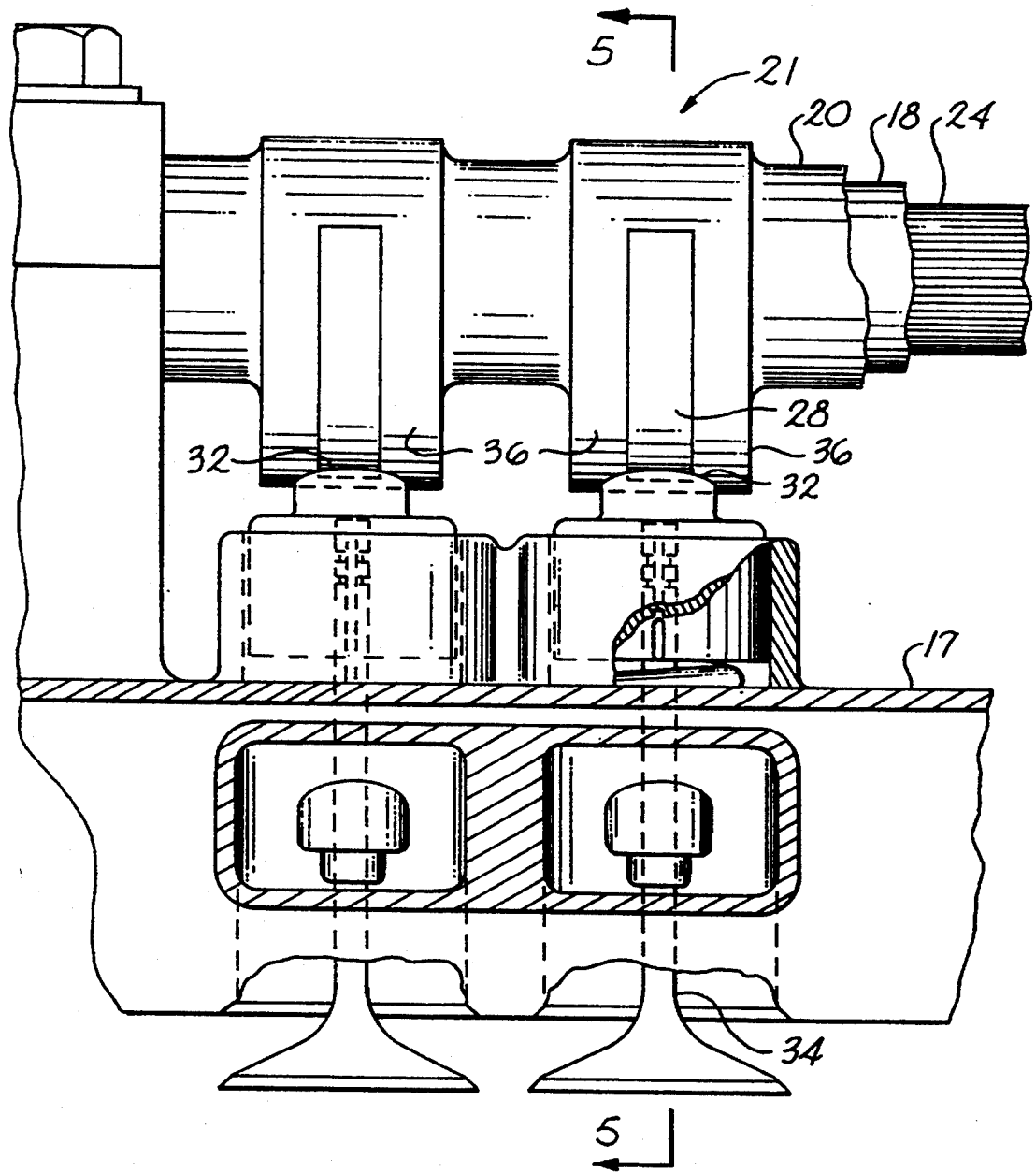
FIG. 6 is a partial plan view taken along the line of sight in the same direction as the arrows pointing to the numerals 6—6 of FIG. 5 and having portions shown in phantom (dashed line) and portions cut away for ease of illustration.

As shown in FIGS. 2, 8, 14 and 16 for example, variable cam member 27 and fixed cam member 29 each have a nose portion 30 for engaging an actuation member. As shown in FIGS. 5 and 6 for example, the actuation member can include a cap 32 for a valve stem 34. As shown in FIGS. 9-11 and 13 for example, the actuation member is a valve 89, which can include an end 33 of a valve stem 34. Variable cam member 27 and fixed cam member 29 are formed of a metallic or other material suitable for the operating environment of these cam members 27, 29.

Figure 2:
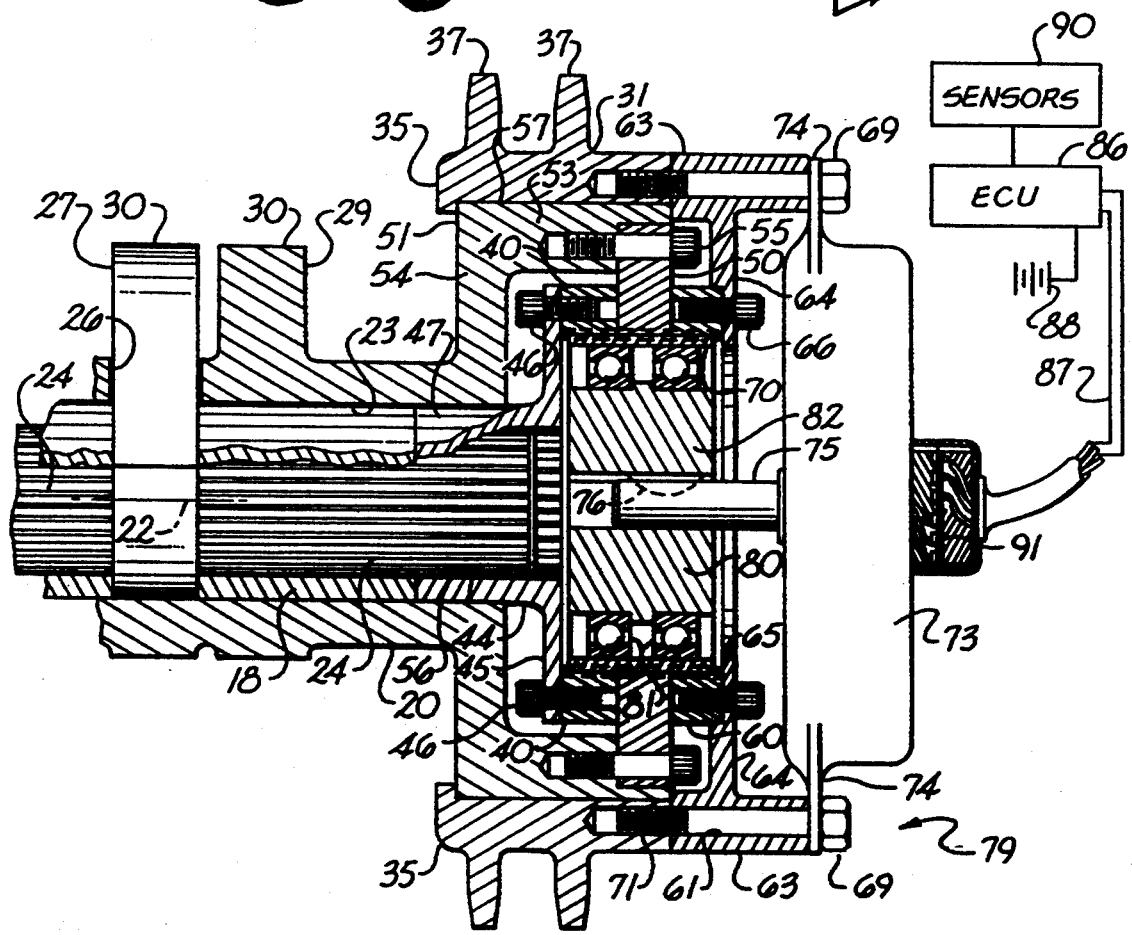
FIG. 2 is a cross-sectional view taken along the line of sight in the same direction as the arrows pointing to the numerals 2—2 of FIG. 1.
Figure 3:
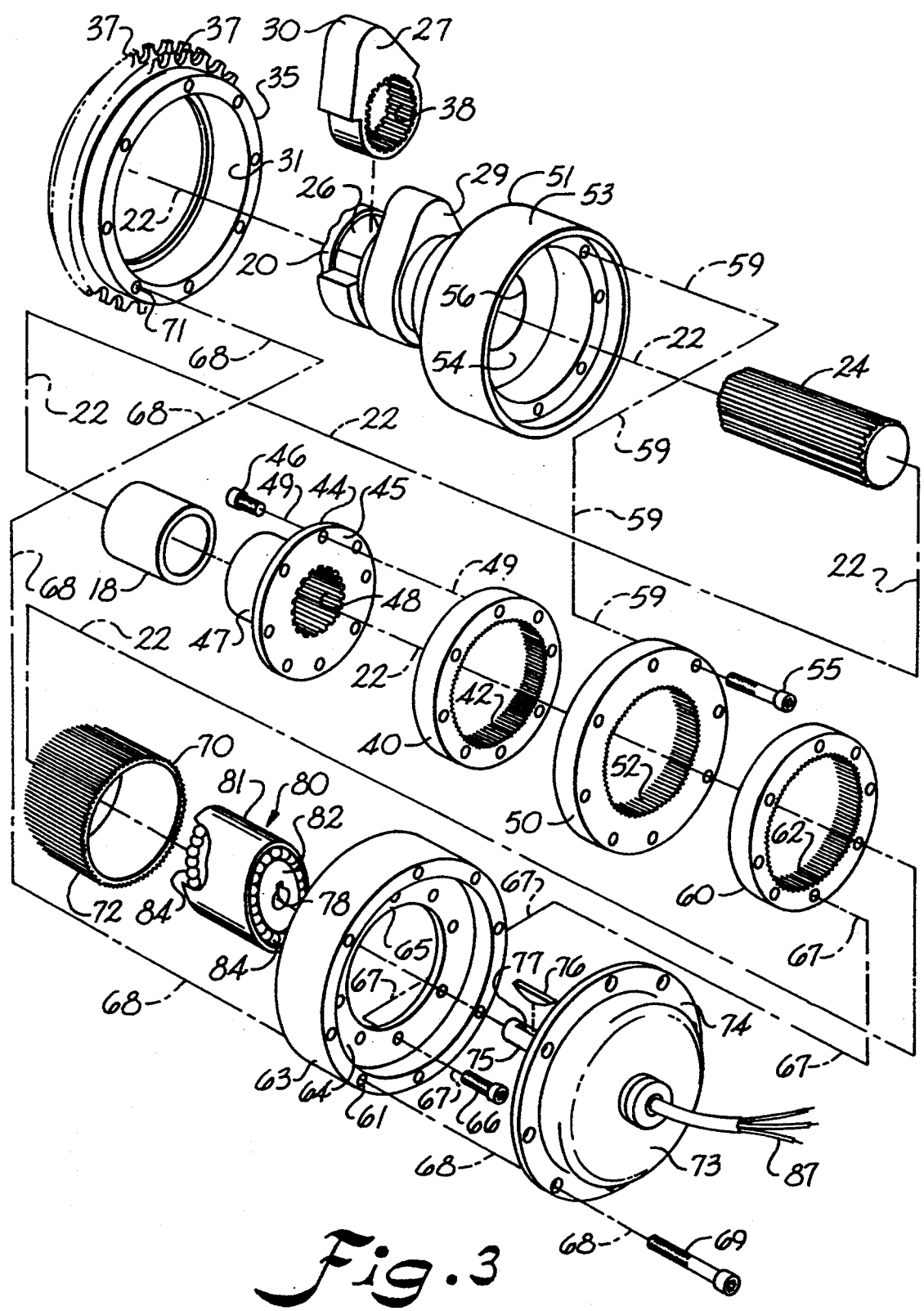
FIG. 3 is an exploded perspective assembly view of the embodiment of FIGS. 1 and 2.
Figure 14:
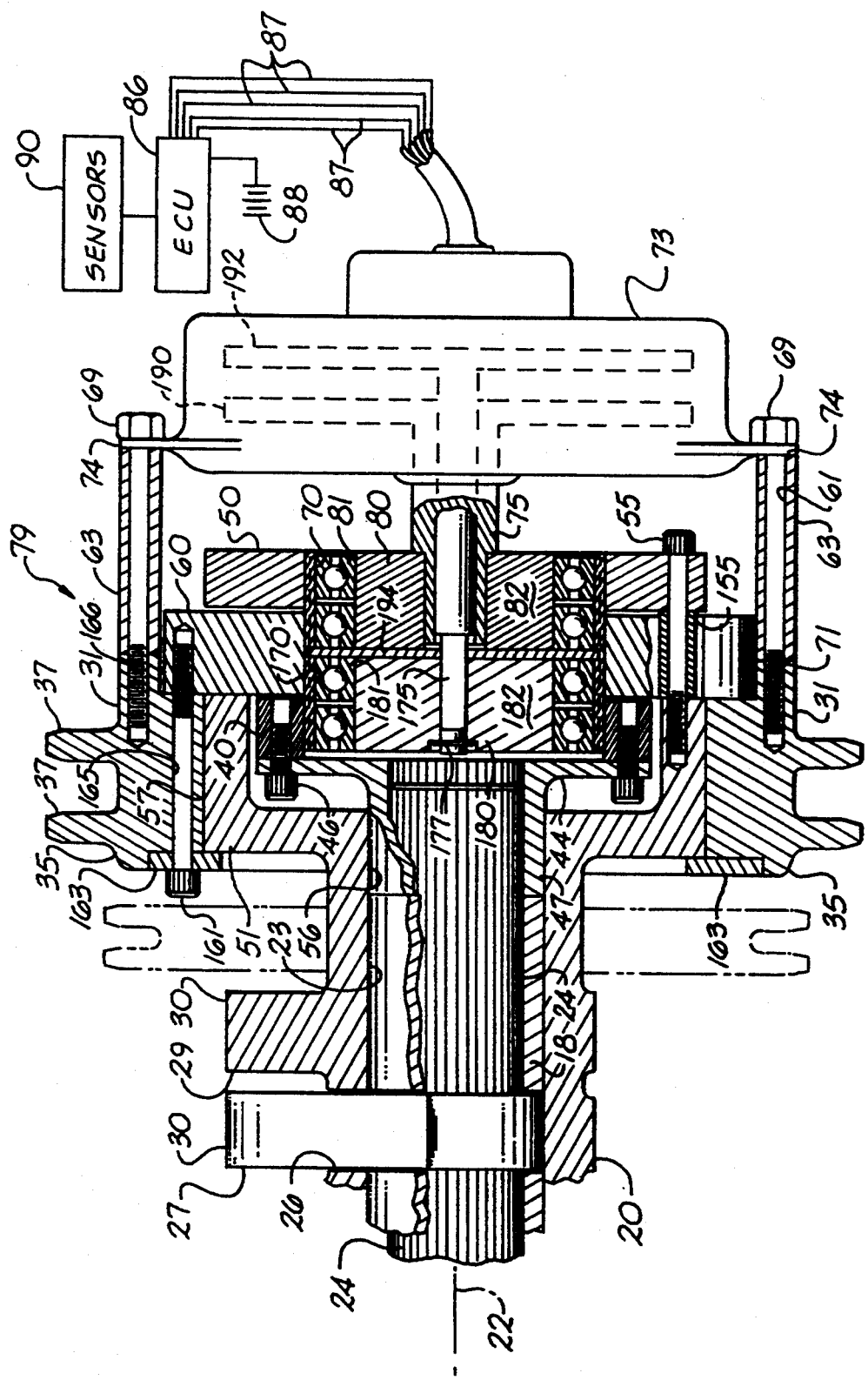
FIG. 14 is a cross-sectional view taken along the line of sight in the same direction as the arrows pointing to the numerals 2—2 of FIG. 1.
Figure 15:
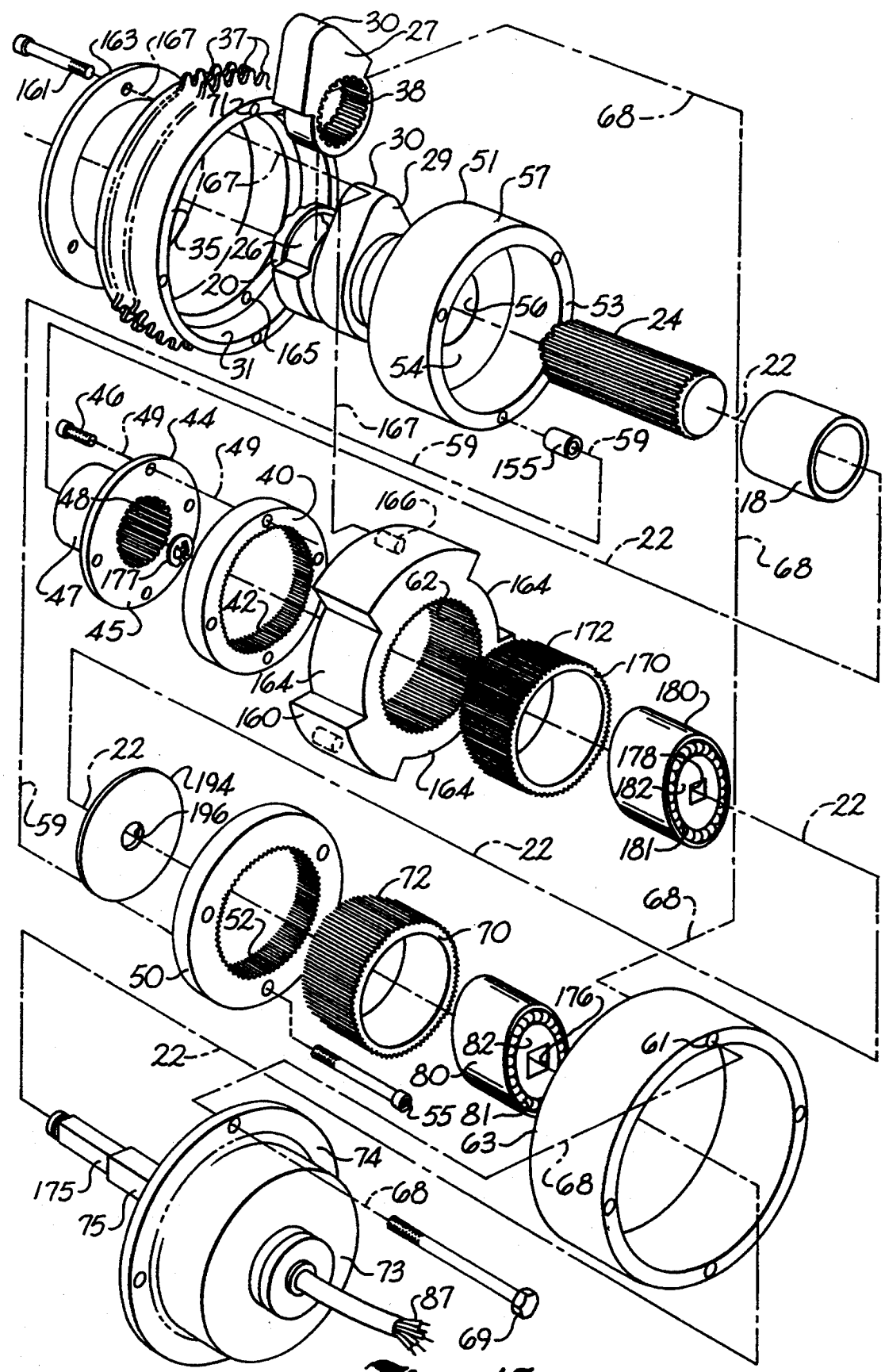
FIG. 15 is an exploded perspective assembly view of the embodiment of FIG. 14.
Figure 16:
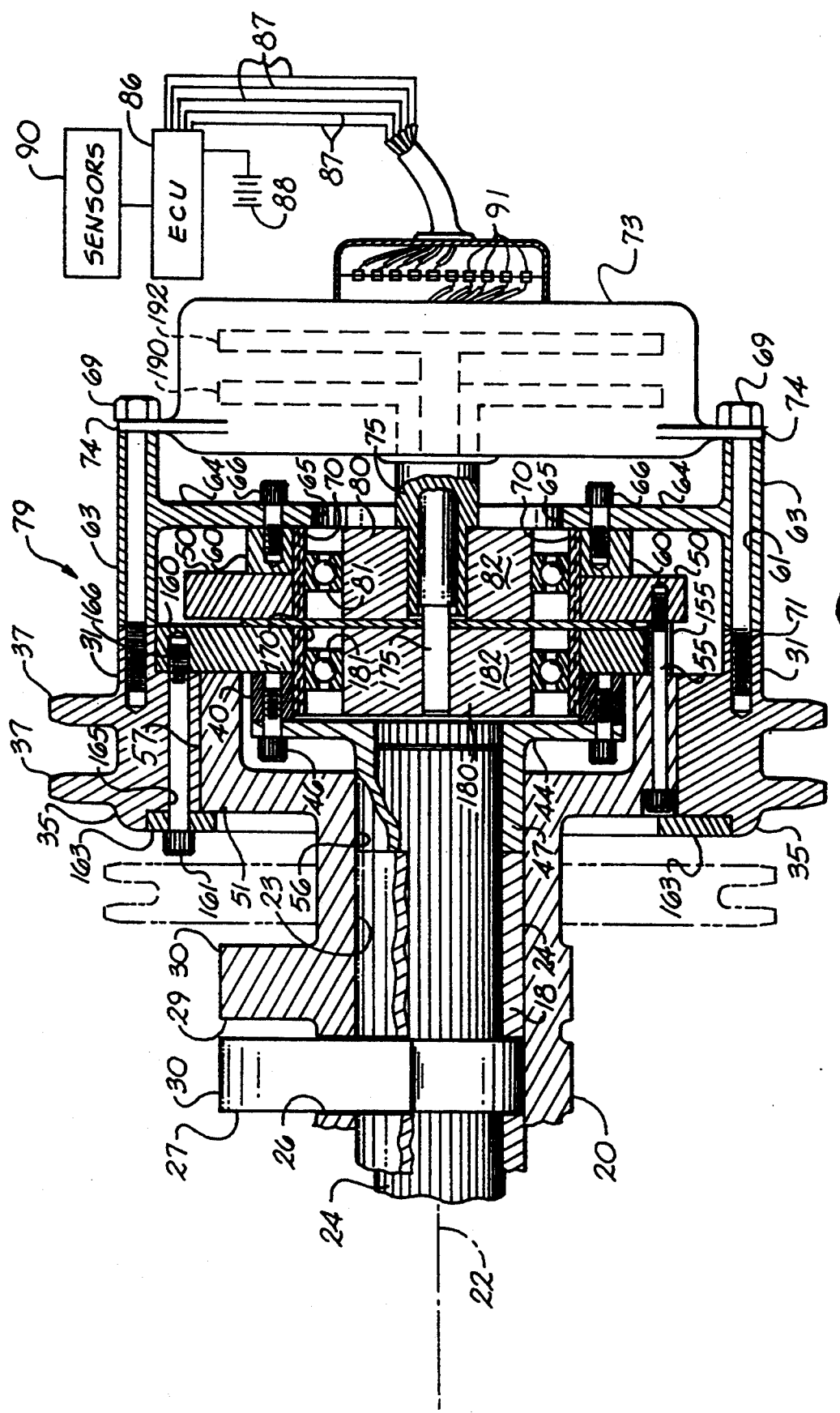
FIG. 16 is a cross-sectional view taken along the line of sight in the same direction as the arrows pointing to the numerals 2—2 of FIG. 1.
Figure 17:
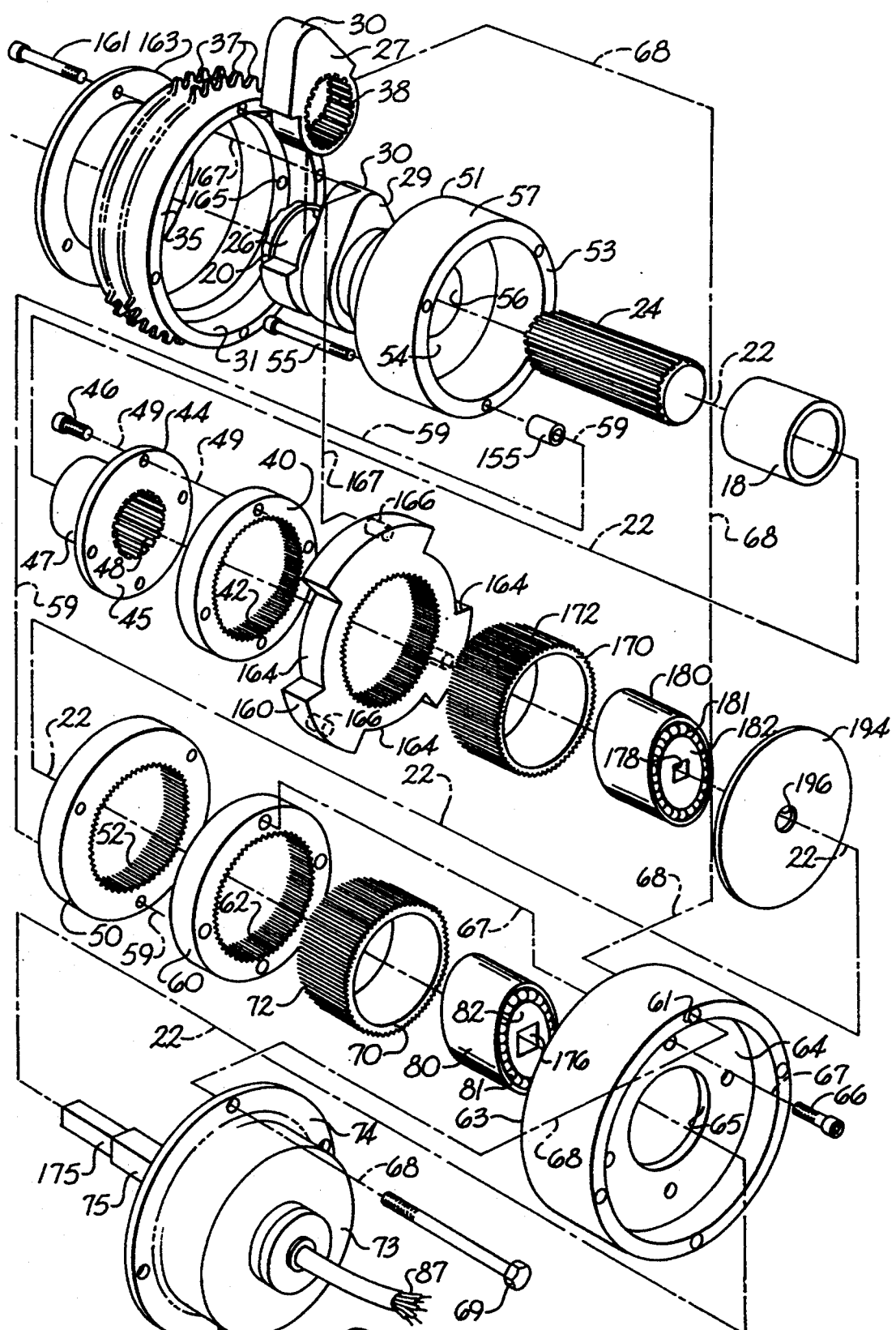
FIG. 17 is an exploded perspective assembly view of the embodiment of FIG. 16.

In the embodiments shown in FIGS. 1-3, 8 and 14-17, the full-width fixed cam members 29 are fixed along the outer surface of outer shaft 20 and therefore necessarily rotate in phase with outer shaft 20. As illustrated in FIGS. 2, 3, 8 and 14-17, outer shaft 20 defines an outer shaft wall opening 26 which is cut completely through the thickness of the wall which defines outer shaft 20. Shaft wall opening 26 permits variable cam member 27 to be dropped into cavity 23 of outer shaft 20. As shown in FIGS. 3, 15 and 17, an inner-shaft opening 38 is formed at the opposite end of variable cam member 27 from nose portion 30. Inner-shaft opening 38 is configured for non-rotatably receiving inner shaft 24 through inner-shaft opening 38. Therefore, the variable cam member 27 necessarily rotates in phase with inner shaft 24. These embodiments are suitable for moving one or more cam members 27 attached to the inner shaft relative to one or more cam members 29 attached to the outer shaft in the same or opposite angular directions relative to the crankshaft 19 by equal or unequal angular amounts to controllably vary the portion of a cycle over which the respective cam member(s) 27, 29 is/(are) actuating valves.

Figure 4:
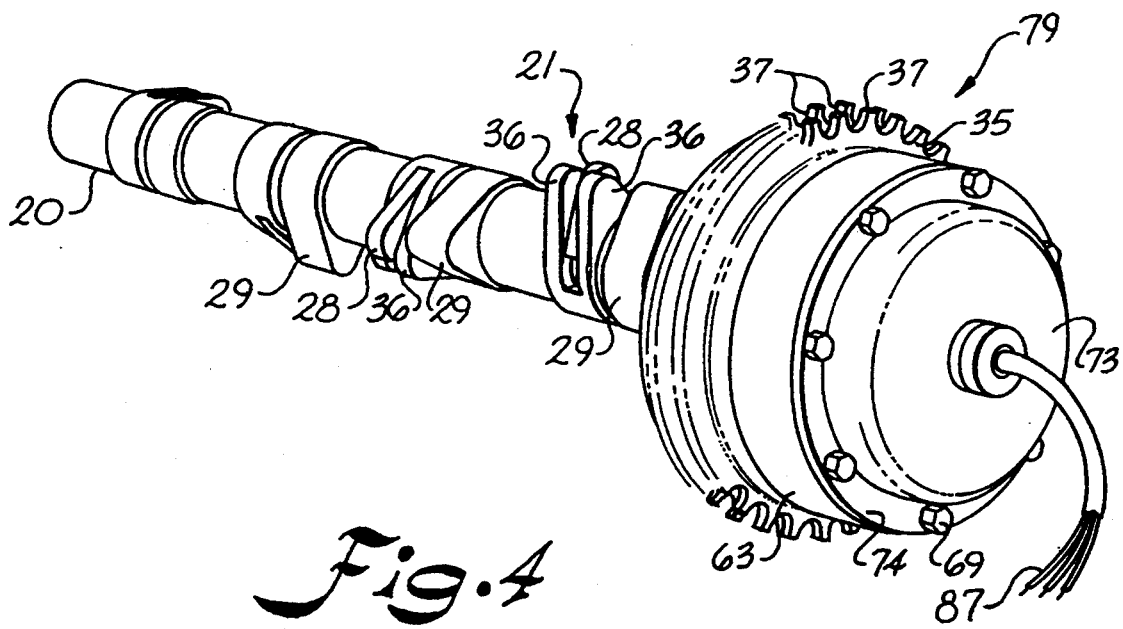
FIG. 4 is an elevated perspective view of an alternative embodiment of the apparatus of the present invention.

In another preferred embodiment shown for example in FIG. 4, the actuating means can comprise a number of splittable cam members 21 and full-width fixed cam members 29 appropriately disposed along the length of shafts 20, 24. This embodiment is suitable for moving one or more cam members and/or camlobe members attached to the inner shaft relative to one or more cam members and/or camlobe members attached to the outer shaft in the same or opposite angular directions relative to the crankshaft by equal or unequal angular amounts to controllably vary the portion of a cycle over which the respective cam members and/or camlobe members are actuating valves. In the embodiment shown in FIG. 4, each splittable cam member 21 includes a variable camlobe member 28 sandwiched between two adjacent fixed camlobe members 36. Each full-width fixed cam member 29 and each fixed camlobe member 36 is fixed along the outer surface of outer shaft 20 and therefore necessarily rotates in phase with outer shaft 20. The cam opening 38 (not shown in FIG. 4) defined through each variable camlobe member 28 is configured for non-rotatably receiving therethrough, inner shaft 24. Therefore, the adjustable camlobe member 28 necessarily rotates in phase with inner shaft 24. As shown in FIGS. 5 and 6 for example, variable camlobe member 28 and fixed camlobe member 36 each have a nose portion 30 for engaging an actuation member such as a cap 32 for a valve stem 34. Variable camlobe member 28 and fixed camlobe members 36 are formed of a metallic, or other material suitable for the operating environment of camlobe members 28, 36.

In yet another preferred embodiment shown for example in FIG. 6, the actuating means can comprise a number of splittable cam members 21 disposed in succession along the length of shafts 20, 24. Such embodiments are suitable for moving one or more camlobe members 28 attached to the inner shaft 24 relative to one or more camlobe members 36 attached to the outer shaft 20 in the same or opposite angular directions relative to the crankshaft by equal or unequal angular amounts to controllably vary the portion of a cycle over which the respective camlobe member(s) is/(are) actuating valves.

As will become apparent upon further reading of this specification, the terms fixed and variable have been arbitrarily selected. Applicants have found it convenient to refer to the cam (or camlobe) member which projects through shaft opening 26 defined in the outer shaft 20, as the variable member. However, the shafts move relative to one another, and thus the cam (or camlobe) members mounted on each shaft move relative to one another. Thus, the respective angular positions of the one or both cam (or camlobe) members can be switched relative to the drive pulley.

In accordance with the present invention, a means is provided for engaging the drive means that rotates the concentric camshaft assembly about the rotational axis. As embodied herein and shown in FIGS. 2, 3, 8 and 14-17 for example, the engaging means can include an annular timing pulley wheel 35 that can be configured with an annular drive pulley wheel collar 31. Annular timing pulley wheel 35 also can be configured with one or more sprockets 37 for engaging a drive chain that in turn is driven by the drive means, which ultimately can be a crankshaft 19 of an internal combustion engine. Since the details of the chain and its connection to the components of the engine forming the drive means, are conventional in the art, they are not emphasized in the FIGS. As is also conventional in the art, an alternative embodiment of the pulley wheel could be configured to engage a continuous belt instead of a chain and could be configured with a single row of teeth instead of a double row of teeth on the sprocket wheel.

In accordance with the present invention, a dual-acting phasing mechanism is provided and includes a first internally splined member. As embodied herein and shown in FIGS. 2, 3, 8 and 14–17 for example, a first internally splined member 40 defines a rigid annular member that is circularly configured and has a circularly cylindrical interior surface. A plurality of splines 42 is defined along the circularly cylindrical interior surface of the first internally splined member 40, which thus forms an internally splined member. As shown in FIGS. 2, 3, 8 and 14–17 for example, first internally splined member 40 is disposed and configured for rotating about the camshaft's rotational axis 22.

In accordance with the dual-acting phasing mechanism of the present invention, a means also is provided for linking the first internally splined member for rotation about the rotational axis and in phase with a first rotatable member. As embodied herein and shown in FIGS. 2, 3, 8 and 14–17 for example, the linking means for first internally splined member 40 desirably includes an inner shaft collar 44 that defines a collar flange 45 integral with a cylindrically configured sleeve portion 47. As schematically indicated by the dashed line designated by the numeral 49 in FIGS. 3, 15 and 17, collar flange 45 is non-rotatably attached to first internally splined member 40 via a plurality of screws 46, and therefore first internally splined member 40 and collar flange 45 are integrally connected and must move in unison. As shown in FIGS. 3, 15 and 17, inner shaft collar 44 further defines a central opening 48, which extends through collar flange 45 and sleeve portion 47. Central opening 48 is configured to nonrotatably receive therein a first rotatable member such as inner shaft 24 and is configured with splines that mate with the splines formed on inner shaft 24 in the embodiments shown. Therefore, in the embodiments shown in FIGS. 3, 15 and 17, inner shaft 24 is a first rotatable member that must move in unison with inner shaft collar 44.

In accordance with the dual-acting phasing mechanism of the present invention, a second splined member is provided. As embodied herein and shown in FIGS. 2, 3, 8 and 14–17 for example, a second splined member 50 defines a rigid annular member that is circularly configured and has a circularly cylindrical interior surface. A plurality of splines 52 is defined along the circularly cylindrical interior surface of second splined member 50, which thus forms an internally splined member. As shown in FIGS. 3, 15 and 17 for example, second internally splined member 50 is disposed and configured for rotating about rotational axis 22.

In accordance with the dual-acting phasing mechanism of the present invention, a means also is provided for linking the second internally splined member for rotation about the rotational axis and in phase with a second rotatable member. As embodied herein and shown in FIGS. 2, 3, 8 and 14–17 for example, the linking means for the second internally splined member desirably includes an outer shaft collar 51, which is integral with a second rotatable member in the form of outer shaft 20 and therefore must move in unison with outer shaft 20. Outer shaft collar 51 can be made integral with outer shaft by being formed as a unitary part of outer shaft 20 or as by welding and/or mechanical attachment or another means of attachment. Outer shaft collar 51 defines a collar flange 53 and a disk-shaped web portion 54 integral with collar flange 53. As schematically indicated by the dashed lines designated by the numeral 59 in FIGS. 3, 15 and 17, collar flange 53 is attached to second internally splined member 50 via a plurality of screws 55, and therefore second internally splined member 50 and collar flange 53 are integrally connected and must move in unison. As shown in FIGS. 16 and 17, a sleeve spacer 155 may be provided in a six-element embodiments of the phaser of the present invention. As shown in FIG. 16, each screw 55 passes rotatably through sleeve spacer 155, which is disposed between and maintains the spacing between, second internally splined member 50 and collar flange 53. Though not shown in FIGS. 14 and 15, a similar sleeve spacer 155 also could be provided for the five-element embodiment of the phaser of the present invention.

Moreover, as shown in FIGS. 2, 3, 8 and 14–17 for example, the exterior surface of collar flange 53 is configured to form a bearing surface 57 for the interior annular surface of annular pulley wheel 35. As shown in FIGS. 2, 3, 8 and 14–17 for example, outer shaft collar 51 further defines a central opening 56, which extends through web portion 54. Central opening 56 is configured to rotatably receive therein either inner shaft 24 or sleeve portion 47 and/or bushing 18.

In yet further accordance with the dual-acting phasing mechanism of the present invention, a third internally splined member is provided. As embodied herein and shown in FIGS. 2, 3, 8 and 14–17 for example, a third internally splined member 60 defines a rigid annular member that is circularly configured and has a circularly cylindrical interior surface. A plurality of splines 62 is defined along the circularly cylindrical interior surface of the third splined member 60, which thus forms an internally splined member. As shown in FIGS. 3, 15 and 17 for example, the third internally splined member 60 is disposed and configured for rotating about rotational axis 22.

In still further accordance with the dual-acting phasing mechanism of the present invention, a means also is provided for linking the third internally splined member for rotation about the rotational axis and in phase with a means for engaging the drive means. As embodied herein and shown in FIGS. 2, 3, 8 and 14–17 for example, the linking means for the third internally splined member 60 can include a motor mount collar 63, which can define in some embodiments an annular web portion 64 with a central opening 65 therethrough. As schematically indicated by the dashed line designated by the numeral 68 in FIGS. 3, 15 and 17, motor mount collar 63 is attached to a drive pulley wheel collar 31 of annular pulley wheel 35 via a plurality of screws 69, which pass through non-threaded elongated openings 61 in motor mount collar 63 and are received in threaded openings 71 in collar 31 of annular pulley wheel 35. Therefore annular pulley wheel 35 and motor mount collar 63 are integrally connected and must move in unison. In the embodiment shown in FIGS. 14 and 15, third internally splined member 60 is nonrotatably connected to annular pulley wheel 35 by several elongated screws 161 which have a smooth shaft extending through an elongated opening 165 extending longitudinally through annular pulley wheel 35 in the direction of the axis of rotation of annular pulley wheel 35. As schematically indicated in the embodiment shown in FIG. 15 by the dashed line designated by the numeral 167, each screw 161 has a threaded end received into a threaded opening 166 (shown in dashed line in FIG. 15) formed in a peripheral portion of third internally splined member 60. Since annular pulley wheel 35 and third internally splined member 60 are integrally connected via a plurality of screws 161, as schematically indicated by the dashed line designated by the numeral 167 in the embodiment shown in FIG. 15, annular pulley wheel 35 and third internally splined member 60 must rotate in unison with each other. Moreover, as noted above, annular pulley wheel 35 and motor mount collar 63 are nonrotatably connected via screws 69 and must rotate in unison. Accordingly, motor mount collar 63 and third internally splined member 60 are nonrotatably connected and must rotate in unison. Moreover, as schematically indicated by the dashed line designated by the numeral 67 in FIGS. 3 and 17, motor mount collar 63 is attached in some embodiments to third internally splined member 60 via a plurality of screws 66, and therefore third internally splined member 60 and motor mount collar 63 are integrally connected and must move in unison. Accordingly, as shown in FIGS. 1, 2, 8 and 14–17, annular pulley wheel 35 and third internally splined member 60 are nonrotatably connected and must rotate in unison.

In further accordance with the dual-acting phasing mechanism of the present invention, a first cylindrically configured flexible member is provided. The first flexible cylindrical member is rotatably disposed about the axis of rotation and at least partially within each internally splined member of a first pairing of two of the first, second, and third internally splined members. As embodied herein and shown in FIGS. 2, 3, 8 and 14–17 for example, a first flexible cylindrical member 70 defines a circularly cylindrical outer surface. A plurality of splines 72 is defined along the circularly cylindrical outer surface of the flexible cylindrical member 70, which thus forms an externally splined member. First flexible cylindrical member 70 is configured from a material that enables it to be flexible enough so as to be elastically deformable out-of-round from the flexible cylindrical member's normal circular transverse cross-sectional shape. For example, first flexible cylindrical member 70 can be formed of spring steel. First flexible cylindrical member 70 is rotatably disposed about rotational axis 22.

Figure 8:
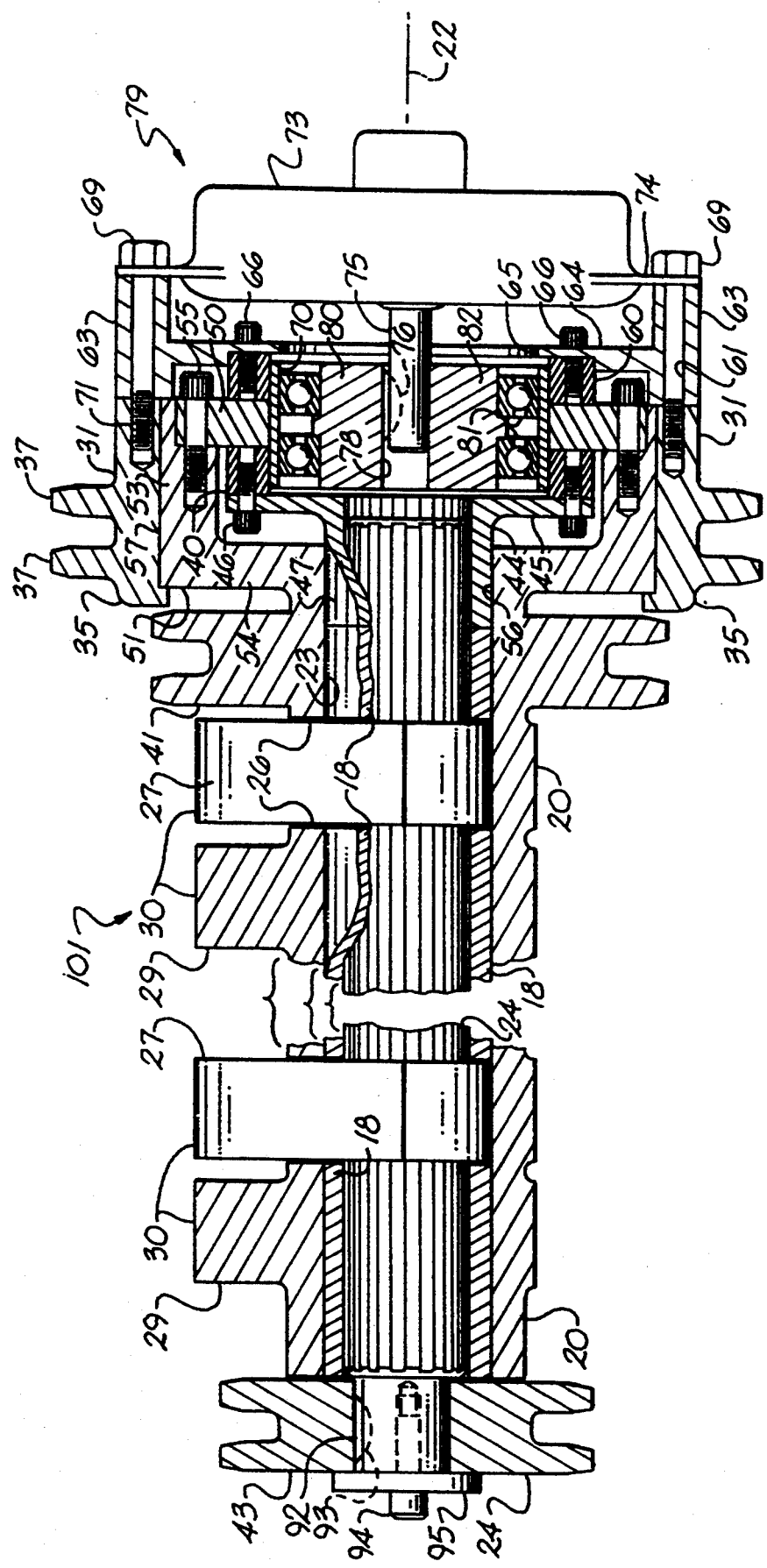
FIG. 8 is a longitudinal cross-sectional view of an embodiment of the present invention configured for a multiple shaft arrangement.

In accordance with the present invention, the first flexible cylindrical member is received and disposed at least partially within each internally splined member of at least a first pairing of two of the first, second, and third internally splined members. As shown in FIGS. 2, 8, 14 and 16 for example, one end of first flexible cylindrical member 70 is disposed at least partially within at least a part of second internally splined member 50, and another portion of first flexible cylindrical member 70 is at least partially disposed within at least a part of third internally splined member 60. As shown in FIGS. 2 and 8 for example, in a four-element dual-phasing mechanism, one end of flexible cylindrical member 70 is disposed at least partially within at least a part of first internally splined member 40, an intermediate portion of flexible cylindrical member 70 is disposed within second internally splined member 50, and the other end of first flexible cylindrical member 70 is disposed at least partially within at least a part of third internally splined member 60. Accordingly, flexible cylindrical member 70 is rotatably disposed at least partially within each of the first, second, and third internally splined members 40, 50, 60, respectively, in a four-element embodiment of the dual-acting mechanism of the present invention.

Figure 7:
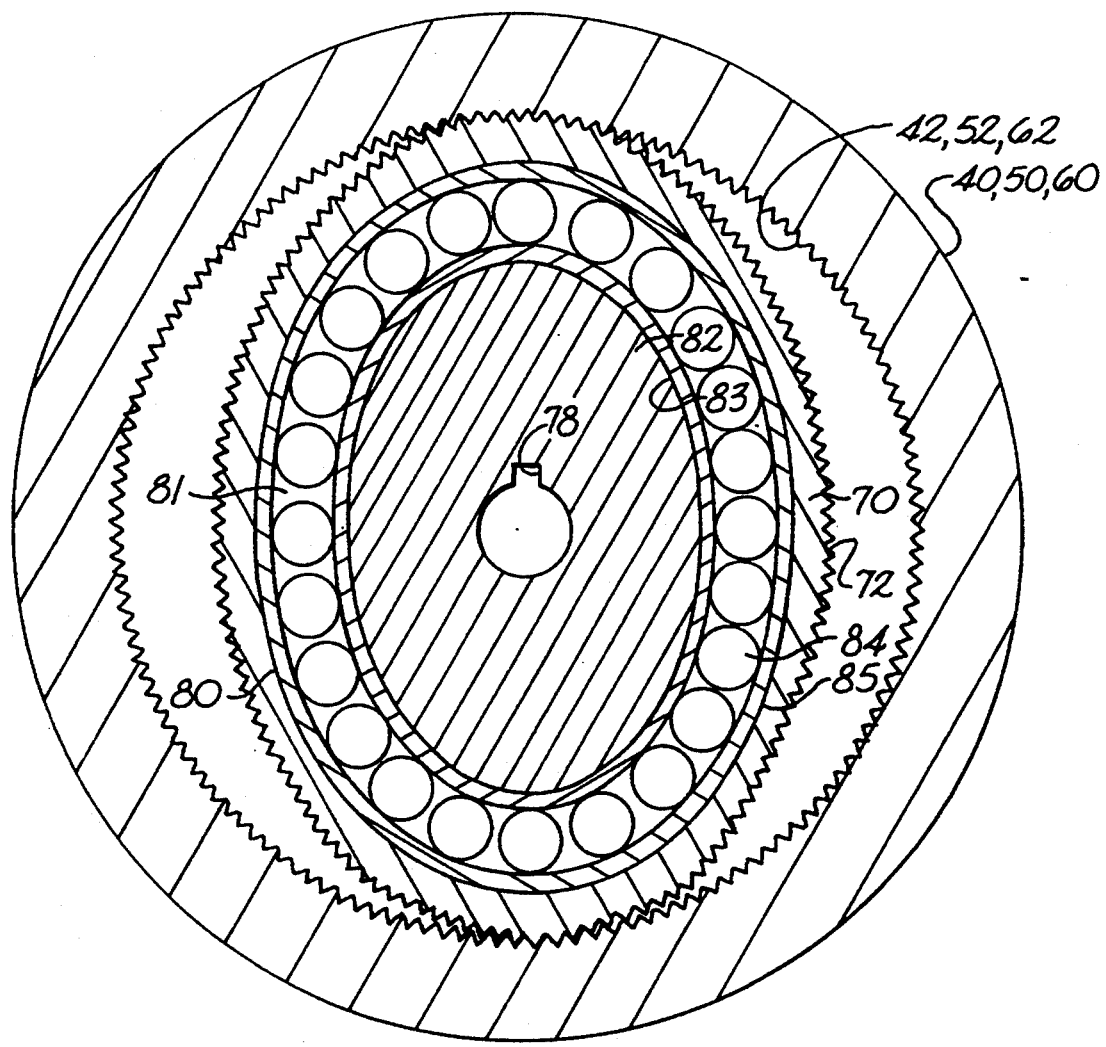
FIG. 7 schematically illustrates relationships between the splines at the opposed points of engagement between the flexible cylindrical member 70 and each of the three internally splined members 40, 50, 60 in the vicinity of the ends of the major axis of the wave generator 80.

In yet further accordance with the dual-acting phasing mechanism of the present invention, an indexing means is provided to index a controlled relative rotation between the externally splined flexible cylindrical member and preselected ones of the internally splined members. As embodied herein and schematically shown for example in FIGS. 2, 3, 7, 8 and 14–17, the indexing means preferably includes a first wave generator 80. As schematically depicted in FIGS. 3, 7, 15 and 17 for example, the so-called first wave generator 80 desirably includes an approximately elliptically-shaped ball-bearing assembly 81 and a centrally disposed rigid member 82 that defines a solid member having an approximately elliptically-shaped transverse cross-section. As shown in FIG. 7, the ball bearing assembly conforms to the shape of the approximately elliptical rigid member 82 and is composed of an inner race 83, a plurality of balls 84, and a flexible outer race 85. As shown in FIGS. 2, 8, 14 and 16 for example, first wave generator 80 defines an axially extending length that is substantially equal to the axially extending length of first flexible cylindrical member 70. As shown in FIG. 7 for example, first wave generator ball-bearing assembly 81 is disposed within first flexible cylindrical member 70.

FIG. 7 schematically shows how ball-bearing assembly 81 deforms first flexible cylindrical member 70, so that member 70, engages respective splines 52 and 62 of each of second and third internally splined members, respectively, in the vicinity of both ends of the major axis of elliptical ball-bearing assembly 81. FIG. 7 attempts to schematically illustrate how each of the splines 72 of opposed portions of the splined outer surface of first flexible cylindrical member 70, engages the respective splines 52, 62, in opposed portions of the interior surface of each of the second and third internally splined members 50, 60, respectively.

Thus, in a four-element embodiment of the present invention, first flexible cylindrical member 70 and each of first, second, and third internally splined members 40, 50, 60 are nonrotatably fixed with respect to each other so that the linked components 40, 50, 60, 70, 80 rotate in unison. (Note: In some applications it may be necessary to apply a small holding torque to the wave generator so that forces on the cams will not move the wave generator away from its linked position with respect to the points where the externally splined member 70 engages internally splined members 40, 50, 60. A stepper motor or a clutching mechanism can provide any needed holding torque.) When the engine drives annular pulley wheel 35, the engine thereby drives the linked components 40, 50, 60, 70, 80 to rotate in unison. Since inner shaft 24 is rigidly connected to first internally splined member 40 and outer shaft 20 is rigidly connected to second internally splined member 50, as explained above, the shafts 20, 24 rotate about rotational axis 22 without relative rotation between shafts 20, 24 and in a fixed phase relationship to the rotation of the engine's crankshaft (not shown in FIGS. 2 and 3).

In further accordance with the dual-acting phasing mechanism of the present invention, a control means is provided to impart a controlled relative rotation between selective ones of the internally splined members. The control means can be configured and disposed to impart a controlled relative rotation between the inner and outer shafts and thereby cause a change in the timing of actuation of the actuation member in the actuating cycle while the drive means is rotating the concentric camshaft. Desirably, the control means has at least a first output member connected to the first wave generator to rotate the first wave generator relative to at least one of the inner shaft, the outer shaft, and the engaging means for the drive means, and about the axis of rotation and only during controlled relative rotation between at least two of the engaging means, the inner shaft and the outer shaft. For example, the controlled relative rotation between the inner and outer shafts causes a commensurate relative movement of the actuating means circumferentially about the axis of rotation. As embodied herein and shown for example in FIGS. 2, 3, 4, 8 and 14–17, the control means further preferably includes an electric motor 73 which is non-rotatably mounted via a flange 74 and screws 69 to drive pulley collar 63. Electric motor 73 has a first output member in the form of a first output shaft 75, which is in turn non-rotatably connected to first approximately elliptically shaped rigid member 82. Operation of electric motor 73, which desirably may be a brushless D.C. motor, a pancake motor or a stepper motor, rotates the first output shaft 75 and first rigid member 82 of first wave generator 80. Thus, controlling operation of electric motor 73 effects controlled movement of first wave generator 80.

In a four-element embodiment of the phaser mechanism of the present invention, the nonrotatable connection between the first approximately elliptically shaped rigid member 82 and first output motor shaft 75 can be effected by a key member 76 (indicated in dashed line in FIGS. 2 and 8). As shown in FIGS. 3 and 7 for example, key member 76 is received partially within a keyway 77 formed partially in the free end of output shaft 75 and partially within a keyway 78 formed within rigid member 82 of first wave generator 80. In each of the five-element (FIG. 15) and six-element (FIG. 17) embodiments, the nonrotatable connection between first approximately elliptically shaped rigid member 82 and first output motor shaft 75 is effected by configuring a non-circular opening 176 formed within first rigid member 82 of first wave generator 80 to receive a similarly configured exterior surface of first output motor shaft 75.

When motor 73 rotates its first output shaft 75 and first wave generator 80 connected thereto, first wave generator 80 continues to deform first flexible cylindrical member 70 to accommodate the major axis of approximately elliptical wave generator assembly 80. The splines 72 of first flexible cylindrical member 70 engage at least the splines 52, 62 of each respective internally splined member 50, 60 in the vicinity of the major axis of wave generator assembly 80. Depending on the relationships between the number of splines on each of internally splined members 50, 60, and first flexible cylindrical member 70, desired relative movements of the engaged internally splined members 50, 60, can be obtained with the apparatus of the present invention. In the four-element embodiment shown in FIGS. 2, 3, and 8, all three internally splined members 40, 50, 60 may be engaged by first flexible cylindrical member 70.

For purposes of illustrating operation of a four-element embodiment of the phaser mechanism of the present invention, assume that third internally splined member 60 has the same number of splines 62 around its circumference as the number of equally sized and spaced splines 72 forming the complete circumference of first flexible cylindrical member 70. In addition, assume that first internally splined member 40 has two fewer splines 42 around its circumference than the number of splines 72 forming the circumference of first flexible cylindrical member 70. Also assume that second internally splined member 50 has two more splines 52 around its circumference than the number of splines 72 forming the circumference of first flexible cylindrical member 70. For example, assume that there are two hundred (200) splines 72, two hundred (200) splines 62, one hundred and ninety eight (198) splines 42, and two hundred and two (202) splines 52. As explained below, these particular spline relationships result in achieving relative rotation between shafts 20, 24, in opposite directions and like amounts upon movement of first wave generator 80.

Since first internally splined member 40 has two fewer splines 42 than first flexible cylindrical member 70, with each complete revolution of first wave generator 80, there is greater than a one-to-one correspondence between the splines 72 of the first flexible cylindrical member 70 and the splines 42 of first internally splined member 40. First internally splined member 40 indexes two splines 42 around ahead of first flexible cylindrical member 70 for each revolution of elliptical first rigid member 82. This results in a net translation between first flexible cylindrical member 70 and first internally splined member 40 in one direction or another, depending upon the direction of rotation of approximately elliptical first rigid member 82. The relative rotation results because the relatively greater number of splines 72 on first flexible cylindrical member 70 means that two of the splines 42 of first internally splined member 40 will twice engage splines 72 of first flexible cylindrical member 70 during each complete rotation of elliptical first wave generator 80.

Since two more splines 52 comprise second internally splined member 50 than comprise first flexible cylindrical member 70, with each complete revolution of approximately elliptical first rigid member 82, there is less than a one-to-one correspondence between the splines 72 of the first flexible cylindrical member 70 and the splines 52 of second internally splined member 50. Second internally splined member 50 indexes two splines 52 behind first flexible cylindrical member 70 for each revolution of first rigid member 82. This results in a net translation between first flexible cylindrical member 70 and second internally splined member 50 in one direction or another, depending upon the direction of rotation of rigid member 82. The relative rotation results because the relatively greater number of splines 52 on second internally splined member 50 means that two of the splines 72 of first flexible cylindrical member 70 will twice engage splines 52 of second internally splined member 50 during each complete rotation of first wave generator 80. Accordingly, rotation of first wave generator 80 causes inner shaft 24 connected to first internally splined member 40 to rotate in a first direction while simultaneously outer shaft 20 connected to second internally splined member 50 rotates in a second direction which is opposite to the first direction. The same principle controls the phase relationship of the rotation of shafts 20, 24 with respect to rotation of the engine crankshaft 19, which is keyed to rotation of third internally splined member 60 in the illustrative example used to explain the principles of operation of the three element embodiment of the present invention.

In another possible arrangement of a four-element embodiment of the present invention, if there is a two spline differential between the first internally splined member 40 and first flexible cylindrical member 70 while there is a four spline differential between second internally splined member 50 and first flexible cylindrical member 70, then rotation of first wave generator 80 causes first internally splined member 40 to rotate relatively less than second internally splined member 50 rotates. Accordingly, rotation of first wave generator 80 causes inner shaft 24 connected to first internally splined member 40 to rotate relatively less in a first direction than the amount that outer shaft 20 connected to second internally splined member 50 rotates in a second direction which is opposite to the first direction.

In still further possible arrangements of a four-element embodiment of the present invention, each of the first and second numbers of splines 42, 52 is either greater than the fourth number of splines 72 on first flexible cylindrical member 70 or less than the fourth number of splines 72 on first flexible cylindrical member 70. In this configuration, both of the first and second internally splined members 40, 50 will move in the same angular direction when first wave generator 80 rotates. If the number of splines on the first and second internally splined members 40, 50 is the same, then both of the first and second internally splined members 40, 50 will move relatively the same amount when first wave generator 80 rotates, assuming that the size relationship of the splines is uniform on each splined surface. Furthermore, if there is a differential between the number of splines 42, 52 on the first internally splined member 40 and the second internally splined member 52, then when the first wave generator rotates, the one with the greater number of splines will move relatively less than the one with the fewer number of splines.

In yet other exemplary configurations of a four-element embodiment of the present invention, the third number of splines 62 on the third internally splined member 60 is either equal to the fourth number of external splines 72 on first flexible cylindrical member 70, greater than the fourth number of external splines 72 or less than the fourth number of external splines 72. When the third number of internal splines 62 is equal to the number of external splines 72 on first flexible cylindrical member 70, angular movement of first wave generator 80 effects no relative angular movement between third internally splined member 60 and first flexible cylindrical member 70. Similarly, depending upon the relationship between the number of splines 62 on third internally splined member 60 on the one hand and the number of splines 42, 52 on either of first and second internally splined members 40, 50, when first wave generator 80 moves, third internally splined member 60 may or may not rotate relative to either of first and second internally splined members 40, 50. The magnitude and direction of relative angular movement depends upon whether the number of splines 62 on third internally splined member 60 is equal to, greater than, or less than the number of splines 42, 52 on either of the first and second internally splined members 40, 50. This relative angular movement also depends upon whether the number of splines 62 on third internally splined member 60 is equal to, greater than, or less than the number of splines 72 on fourth externally splined member 70.

In further accordance with the present invention, the control means can further include an electronic control unit 86 which can be preprogrammed to process input information constituting operating parameters of an engine which includes an actuation member such as a valve 89 (FIG. 5). Electronic control unit 86, as schematically shown in FIGS. 2, 14 and 16 for example, is electrically connected in communication with electric motor 73 and can be preprogrammed to control motor 73 based upon the engine's operating status, which is indicated by such parameters as engine temperature, speed, exhaust gas composition, and the like. Such parameters can be determined from one or more sensors 90 supplying operating inputs to electronic control unit 86, or based upon the sensed operator-supplied inputs received by unit 86, or based in part upon both. The operator supplied inputs will correspond to at least one engine operating condition that the operator desires to attain. For example, the operator desires to control the speed of the vehicle. Actuation of electric motor 73 can be controlled via appropriate electrical leads 87 connecting a power source 88 (such as a battery and/or alternator) via electronic control unit 86 through sliding electrical contacts 91 (or rotating magnetic field) to electric motor 73.

Thus, the relative timing of shafts 20, 24 can be changed relative to the original timing. Moreover, relative angular movements between the shafts 20, 24, with their attached cam and/or camlobe members can be changed relative to the angular direction of rotation of the drive means depending on the angular direction of rotation of first wave generator 80.

Each of the five-element phaser and the six-element phaser is an extension of the four-element dual-acting phasing mechanism embodiment described above. In the four-element dual-acting phasing mechanism embodiment described above, mutually dependent adjustment of the timing of valve events is effected. This means that the change in timing of the valves actuated by one of the shafts, inner or outer, of the concentric shaft, is responsible for a commensurate change in the timing in the valves actuated by the other of the shafts, inner or outer, of the concentric shaft. In contrast to the four-element embodiment, each of the five-element and six-element embodiments provides the capability for independent adjustment of the timing of all valve events for internal combustion engines. This means that the change in timing of the valves actuated by one of the shafts, inner or outer, of the concentric shaft, need not be responsible for a commensurate change in the timing in the valves actuated by the other of the shafts, inner or outer, of the concentric shaft. As with the four-element embodiments, the five- and six-element embodiments also apply to nonconcentric camshaft arrangements like those shown in FIGS. 12 and 13. Each of the five-element and six-element embodiments still retains the capability to change the valve events actuated by each shaft in a commensurate manner as if they were linked to be mutually dependent as in the four-element embodiment, if desired.

FIG. 14 shows an assembled five-element embodiment of the dual-acting phasing mechanism, and FIG. 16 shows an assembled six-element embodiment of the dual-acting phasing mechanism. Much of the above discussion for the four-element phaser embodiment (FIGS. 2, 3, 8 and 12 for example) applies equally well to each of the five-element phaser embodiment (FIGS. 14 and 15 for example) and the six-element phaser embodiment (FIGS. 16 and 17 for example). The following discussion describes the additional features of the five-element and six-element embodiments of the dual-acting phaser of the present invention.

In accordance with the six-element embodiment, a fourth internally splined member is nonrotatably connected to the engaging means. As embodied herein and shown in FIGS. 16 and 17 for example, a fourth internally splined member 160 defines a rigid annular member that is circularly configured and has a circularly cylindrical interior surface. A plurality of splines 162 is defined along the circularly cylindrical interior surface of the fourth splined member 160. As shown in FIG. 17 for example, the fourth internally splined member 160 is disposed and configured for rotating about rotational axis 22. In still further accordance with the present invention, a means is provided for linking the fourth internally splined member with the third internally splined member. As shown in FIGS. 16 and 17, fourth internally splined member 160 is nonrotatably connected to annular pulley wheel 35 by several elongated screws 161 which have a smooth shaft extending through an elongated opening 165 extending longitudinally through annular pulley wheel 35 in the direction of the axis of rotation of annular pulley wheel 35. As schematically indicated in FIG. 17 by the dashed line designated by the numeral 167, each screw 161 has a threaded end received into a threaded opening 166 (shown in dashed line in FIG. 17) formed in a peripheral portion of fourth internally splined member 160. Since annular pulley wheel 35 and fourth internally splined member 160 are integrally connected via a plurality of screws 161, as schematically indicated by the dashed line designated by the numeral 167 in FIG. 17, annular pulley wheel 35 and fourth internally splined member 160 must rotate in unison with each other. Moreover, as noted above, annular pulley wheel 35 and motor mount collar 63 are nonrotatably connected via screws 69 and must rotate in unison. Accordingly, motor mount collar 63 and fourth internally splined member 160 are nonrotatably connected and must rotate in unison. As noted above, third internally splined member 60 and motor mount collar 63 are nonrotatably connected to rotate in unison by screws 66. Thus, third internally splined member 60 and fourth internally splined member 160 are linked together via motor mount collar 63 and drive pulley wheel collar 31 and must rotate in unison. Therefore, in the six-element embodiment, the components that rotate in unison include motor mount collar 63, motor 73, third internally splined member 60, fourth internally splined member 160, and annular pulley wheel 35.

As shown in FIGS. 14–17, in each of the five-element and six-element embodiments a flat retaining washer 163 is received into a ledge formed into annular pulley wheel 35 and held there by the head of screws 161. Retaining washer 163 retains annular pulley wheel 35 in a fixed rotational relationship with respect to outer shaft collar 51. As shown in FIG. 15 for example, a plurality of cutouts 164 are formed in peripheral portions of third internally splined member 60. As shown in FIG. 17 for example, a plurality of cutouts 164 are formed in peripheral portions of fourth internally splined member 160. Cutouts 164 accommodate screws 55 received in spacers 155 to attach second internally splined member 50 to outer shaft collar 51. In some embodiments (not shown), spacers 155 can be eliminated by having sleeves formed integrally with outer shaft collar 51 and thereby simplify assembly of the phasing mechanism.

In each of the five-element (FIGS. 14 and 15) and six-element (FIGS. 16 and 17) embodiments, a second cylindrically configured flexible member 170 is provided. Second flexible cylindrical member 170 is configured substantially the same as first flexible cylindrical member 70 and defines a circularly cylindrical outer surface. A plurality of splines 172 is defined along the circularly cylindrical outer surface of the second flexible cylindrical member 170, which thus forms a second externally splined member. The second flexible cylindrical member 170 can have either the same or a different number of splines as the first flexible cylindrical member 70, as desired or required by the particular application of the phaser. In the five-element embodiment, second flexible cylindrical member 170 desirably has the same number of splines as the first flexible cylindrical member 70. Second flexible cylindrical member 170 is configured from a material that enables it to be flexible enough so as to be elastically deformable out-of-round from the flexible cylindrical member's normal circular transverse cross-sectional shape. For example, second flexible cylindrical member 170 can be formed of spring steel. Second flexible cylindrical member 170 is rotatably disposed about rotational axis 22.

In accordance with the present invention, the second flexible cylindrical member is rotatably disposed about the axis of rotation and at least partially within each internally splined member of a second pairing of two of the internally splined members. As shown in FIGS. 14 and 16, one portion of second flexible cylindrical member 170 is at least partially disposed within at least a part of first internally splined member 40. As shown in FIG. 14 for example, another end of second flexible cylindrical member 170 is disposed at least partially within at least a part of third internally splined member 60. As shown in FIG. 16 for example, another end of second flexible cylindrical member 170 is disposed at least partially within at least a part of fourth internally splined member 160.

In each of the five-element (FIGS. 14 and 15) and six-element (FIGS. 16 and 17) embodiments, the indexing means can include a second wave generator 180, which is configured substantially the same as first wave generator described above and shown in FIG. 7. Thus, as shown in FIGS. 15 and 17 for example, the second wave generator 180 desirably includes an approximately elliptically-shaped second ball-bearing assembly 181 and a centrally disposed second rigid member 182 that defines a solid member having an approximately elliptically-shaped transverse cross-section. The second ball bearing assembly 181 conforms to the shape of the approximately elliptical second rigid member 182 and is composed of an inner race, a plurality of balls, and a flexible outer race in the same way as the inner race 83, balls 84 and outer race 85 as shown in FIG. 7. As shown in FIGS. 14 and 16 for example, second wave generator 180 defines an axially extending length that is substantially equal to the axially extending length of second flexible cylindrical member 170. As shown in FIGS. 14 and 16 for example, second wave generator ball-bearing assembly 181 is disposed within second flexible cylindrical member 170.

In each of the five-element (FIGS. 14 and 15) and six-element (FIGS. 16 and 17) embodiments, the control means can include a second electric motor. As schematically shown in FIGS. 14 and 16 by the dashed lines, the second electric motor may be constructed as a single unit 73 with two separate rotors 190, 192 and field windings inside one housing. Alternatively, the control means in each of the five-element and six-element embodiments can include two separate motors fastened together (not shown) in-line. In either case, a second output shaft 175 must be provided for either the second motor or rotor 192. In each of the five-element (FIG. 14) and six-element (FIG. 16) embodiments, first output shaft 75 must be tubular and be attached to the first wave generator 80, while the second output shaft 175 of the second motor or rotor must be of a smaller diameter so that it can pass through the elongated opening formed through the first shaft 75 of the first motor or rotor 190 in order to be attached to the second wave generator 180. A single slipring assembly 191 provides separate electrical connections for the two motors or rotors 190, 192 via sliding electrical contacts 91. However, in an embodiment with a brushless electric motor, sliprings are not needed because the brushless motor achieves commutation by means of a rotating magnetic field. A single electronic control unit 86 can be programmed to provide independent controlling signals for the two motors or rotors 190, 192. As shown in FIGS. 14 and 15 for example, a snap-ring 177 can be provided to hold second wave generator 180 in place on second output shaft 175. In addition, second output shaft 175 is configured to rotate with respect to first output shaft 75 and is nonrotatably connected to second approximately elliptically shaped rigid member 182. The nonrotatable connection between second approximately elliptically shaped rigid member 182 and second output motor shaft 175 is effected by configuring a noncircular opening 178 formed within second rigid member 182 of second wave generator 180 to receive a similarly configured exterior surface of second output motor shaft 175. Operation of the second rotor 192 of electric motor 73, rotates the second output shaft 175 and second rigid member 182 of second wave generator 180. Thus, controlling operation of electric motor 73 effects controlled movement of second wave generator 180.

When motor 73 rotates its second output shaft 175 and second wave generator 180 connected thereto, second wave generator 180 continues to deform second flexible cylindrical member 170 to accommodate the major axis of approximately elliptical second wave generator assembly 180. In the five-element embodiment shown in FIG. 14, the splines 172 of second flexible cylindrical member 170 engage the splines 42, 62 of each respective internally splined member 40, 60 in the vicinity of the major axis of second wave generator assembly 180. In the six-element embodiment shown in FIG. 16, the splines 172 of second flexible cylindrical member 170 engage the splines 42, 162 of each respective internally splined member 40, 160 in the vicinity of the major axis of second wave generator assembly 180. Depending on the relationships between the number of splines on each of the internally splined members and second flexible cylindrical member 170, desired relative movements of the engaged internally splined members can be obtained with each of the five-element and six-element embodiments of the present invention.

In each of the embodiments of the dual-acting phasing mechanism of the present invention including two wave generators, a means is provided to separate the two wave generators sufficiently to enable them to rotate independently without interfering with one another. As embodied herein and shown in FIGS. 14–17 for example, the separating means can include a separation disk 194 that is configured and disposed between first and second wave generators 80, 180 to separate first and second wave generators 80, 180 sufficiently to enable them to rotate separately without interfering with one another. As shown in FIGS. 15 and 17 for example, separation disk 194 has a centrally disposed opening 196 and extends radially from opening 196, which is configured to rotatably receive second output shaft 175. In the embodiments shown in FIGS. 14–17, separation disk 194 likewise is configured to separate first and second externally splined flexible cylindrical members 70, 170 sufficiently to enable them to rotate independently without interfering with one another.

The capability for independent adjustment of the timing of all valve events when employing the five-element embodiment of the present invention, results from the use of the three internally splined members 40, 50, 60 in combination with the two externally splined flexible members 70, 170 and the first and second wave generators 80, 180. As shown in FIG. 14, the five-element phaser unit's first externally splined flexible member 70 mates with its second internally splined member 50 and the adjacently disposed third internally splined member 60. The five-element phaser unit's second externally splined flexible member 170 mates with its first internally splined member 40 and third internally splined member 60. Similarly, the capability for independent adjustment of the timing of all valve events when employing the six-element embodiment shown in FIGS. 16 and 17, results from the use of the four internally splined members 40, 50, 60, 160 in combination with the two externally splined flexible members 70, 170 and the first and second wave generators 80, 180. The six-element phaser unit's first externally splined flexible member 70 mates with its second internally splined member 50 and the adjacently disposed third internally splined member 60. The six-element phaser unit's second externally splined flexible member 170 mates with its first internally splined member 40 and fourth internally splined member 160. The number of splines (42, 52, 62, 162) on each internally splined member (40, 50, 60, 160, respectively) and on each externally splined flexible member 70, 170 can be that number normally used in standard Harmonic Drive TM units. It is not necessary to choose special splining ratios to accomplish the desired operation of the dual-acting phaser of the present invention. Each externally splined flexible member 70, 170 has its own wave generator (80 and 180 respectively), which is actuated by a separate motor output shaft (75 and 175 respectively) from the rotors 190, 192, respectively, of electric motor 73 or from two separate motors (not shown).

For purposes of illustrating operation of the five-element embodiment of the phaser mechanism of the present invention, assume that first flexible cylindrical member 70 has the same number of splines 72 around its circumference as the number of equally sized and spaced splines 172 forming the complete circumference of second flexible cylindrical member 170. Assume that third internally splined member 60 has the same number of splines 62 around its circumference as the number of equally sized and spaced splines 72 forming the complete circumference of first flexible cylindrical member 70. In addition, assume that first internally splined member 40 has two fewer splines 42 around its circumference than the number of splines 172 forming the circumference of second flexible cylindrical member 170. In addition, assume that second internally splined member 50 has the same number of splines 52 as the number of splines 72, 172 of first and second flexible cylindrical members 70, 170, respectively. For example, assume that there are two hundred (200) splines 52, 62, 72, 172, and one hundred and ninety eight (198) splines 42. As explained below, these particular spline relationships can result in achieving relative rotation between shafts 20, 24, in opposite directions and like amounts depending upon movement of first wave generator 80 and second wave generator 180 and the relative amounts of their respective movements and the relative directions of their movements.

Since first internally splined member 40 has two fewer splines 42 than the number of splines 172 carried on second flexible cylindrical member 170, then with each complete revolution of second wave generator 180 there is greater than a one-to-one correspondence between the splines 172 of the second flexible cylindrical member 170 and the splines 42 of first internally splined member 40. First internally splined member 40 indexes two splines 42 around ahead of second flexible cylindrical member 170 for each revolution of elliptical rigid member 182. This results in a net translation between second flexible cylindrical member 170 and first internally splined member 40 in one direction or another, depending upon the direction of rotation of approximately elliptical second rigid member 182. The relative rotation results because the relatively greater number of splines 172 on second flexible cylindrical member 170 means that two of the splines 42 of first internally splined member 40 will twice engage splines 172 of second flexible cylindrical member 170 during each complete rotation of second wave generator 180. The same is true for second internally splined member 50, because it has the same number of splines 52 as the number of splines 172 on second flexible cylindrical member 172. Thus, rotation of second rigid member 182 causes both inner shaft 24 and the annular pulley wheel 35 to rotate the same angular amount and in the same direction with respect to outer shaft 20, which is linked to rotate in unison with second internally splined member 50.

Since second internally splined member 50 has the same number of splines 52 as the number of splines 72 carried on first flexible cylindrical member 70, with each complete revolution of approximately elliptical first rigid member 82, there is a one-to-one correspondence between the splines 72 of the first flexible cylindrical member 70 and the splines 52 of second internally splined member 50. This results in a continued correspondence between first flexible cylindrical member 70 and second internally splined member 50 in one direction or another, depending upon the direction of rotation of first rigid member 82. Since third internally splined member 60 has the same number of splines 62 as the number of external splines 72 on first flexible cylindrical member 70, with each complete revolution of approximately elliptical first rigid member 82, there is a one-to-one correspondence between the splines 72 of the first flexible cylindrical member 70 and the splines 62 of third internally splined member 60. Accordingly, rotation of first wave generator 80 does not cause outer shaft 20 connected to second internally splined member 50 to rotate relative to annular pulley wheel 35, which is linked to third internally splined member 60. Thus, rotation of second wave generator 180 permits inner shaft 24 to be rotated with respect to the crankshaft 19, which is linked to rotate in unison with the annular pulley wheel 35, and with respect to outer shaft 20. Similarly, rotation of first wave generator 80 maintains the correspondence between outer shaft 20 and the crankshaft 19, which is linked to rotate in unison with the annular pulley wheel 35, and with respect to inner shaft 24.

In other words, the five-element embodiment permits the two shafts 20, 24 to be rotated independently of each other and in differing amounts relative to the rotation of the crankshaft 19 and in differing directions relative to the rotation of the crankshaft 19. The amount of the relative rotation depends on size relationships, the number of revolutions of first and second wave generators 80, 180, respectively, and the relative number of splines 42, 52, 62, 72, 172. The direction of rotation depends on the direction of rotation of first and second wave generators 80, 180, respectively.

For purposes of illustrating operation of the six-element embodiment of the phaser mechanism of the present invention as shown in FIGS. 16 and 17 for example, assume that third internally splined member 60 has the same number of splines 62 around its circumference as the number of equally sized and spaced splines 72 forming the complete circumference of first flexible cylindrical member 70. In addition, assume that first internally splined member 40 has two fewer splines 42 around its circumference than the number of splines 172 forming the circumference of second flexible cylindrical member 170. In addition, assume that fourth internally splined member 160 has the same number of splines 162 as first splined member 40. In other words, fourth internally splined member 160 has two fewer splines 162 around its circumference than the number of splines 172 forming the circumference of second flexible cylindrical member 170. Also assume that second internally splined member 50 has two more splines 52 around its circumference than the number of splines 72 forming the circumference of first flexible cylindrical member 70. For example, assume that there are two hundred (200) splines 72, two hundred (200) splines 62, two hundred and two (202) splines 52, one hundred and ninety eight (198) splines 42, and one hundred and ninety eight (198) splines 162. As explained below, these particular spline relationships can result in achieving relative rotation between shafts 20, 24, in opposite directions and like amounts depending upon movement of first wave generator 80 and second wave generator 180 and the relative amounts of their respective movements and the relative directions of their movements.

Since first internally splined member 40 has two fewer splines 42 than the number of splines 172 carried on second flexible cylindrical member 170, with each complete revolution of second wave generator 180, there is greater than a one-to-one correspondence between the splines 172 of the second flexible cylindrical member 170 and the splines 42 of first internally splined member 40. First internally splined member 40 indexes two splines 42 around ahead of second flexible cylindrical member 170 for each revolution of elliptical rigid member 182. This results in a net translation between second flexible cylindrical member 170 and first internally splined member 40 in one direction or another, depending upon the direction of rotation of approximately elliptical second rigid member 182. The relative rotation results because the relatively greater number of splines 172 on second flexible cylindrical member 170 means that two of the splines 42 of first internally splined member 40 will twice engage splines 172 of second flexible cylindrical member 170 during each complete rotation of second wave generator 180. The same is true for fourth internally splined member 160, because it has the same number of splines 162 as the number of splines 42 on first internally splined member 40. Thus, as shown in FIGS. 16 and 17 for example, rotation of second rigid member 182 causes both inner shaft 24 and the annular pulley wheel 35 to rotate the same angular amount and in the same direction with respect to outer shaft 20, which is linked to rotate in unison with second internally splined member 50.

Since second internally splined member 50 has two more splines 52 than the number of splines 72 carried on first flexible cylindrical member 70, with each complete revolution of approximately elliptical first rigid member 82, there is less than a one-to-one correspondence between the splines 72 of the first flexible cylindrical member 70 and the splines 52 of second internally splined member 50. Second internally splined member 50 indexes two splines 52 behind first flexible cylindrical member 70 for each revolution of first rigid member 82. This results in a net translation between first flexible cylindrical member 70 and second internally splined member 50 in one direction or another, depending upon the direction of rotation of first rigid member 82. The relative rotation results because the relatively greater number of splines 52 on second internally splined member 50 means that two of the splines 72 of first flexible cylindrical member 70 will twice engage splines 52 of second internally splined member 50 during each complete rotation of first wave generator 80. Since third internally splined member 60 has the same number of splines 62 as the number of external splines 72 on first flexible cylindrical member 70, with each complete revolution of approximately elliptical first rigid member 82, there is a one-to-one correspondence between the splines 72 of the first flexible cylindrical member 70 and the splines 62 of third internally splined member 60. Accordingly, rotation of first wave generator 80 causes outer shaft 20 connected to second internally splined member 50 to rotate relative to annular pulley wheel 35, which is linked to third internally splined member 60. Depending on the direction of rotation of first wave generator 80, outer shaft 20 rotates in the same or the opposite direction as inner shaft 24. Thus, rotation of second wave generator 180 permits inner shaft 24 to be rotated with respect to the crankshaft 19, which is linked to rotate in unison with the annular pulley wheel 35, and with respect to outer shaft 20. Similarly, rotation of first wave generator 80 permits outer shaft 20 to be rotated with respect to the crankshaft 19, which is linked to rotate in unison with the annular pulley wheel 35, and with respect to inner shaft 24.

In other words, the six-element embodiment permits the two shafts 20, 24 to be rotated independently of each other and in differing amounts relative to the rotation of the crankshaft 19 and in differing directions relative to the rotation of the crankshaft 19. The amount of the relative rotation depends on size relationships, the number of revolutions of first and second wave generators 80, 180, respectively, and the relative number of splines 42, 52, 62, 162, 72, 172. The direction of rotation depends on the direction of rotation of first and second wave generators 80, 180, respectively.

In the embodiment illustrated in FIG. 6, one can control relative movement between the variable camlobe member 28 and fixed camlobe members 36 of each splittable cam member 21 along the shaft, while simultaneously controlling relative movement between one or both camlobe members, variable 28 and fixed 36, and the drive means which is keyed in phase with third internally splined member 60.

The splittable cam member embodiment shown in FIG. 6 can be used as one or both of the camshafts in engines with dual camshaft arrangements. This splittable cam member embodiment can be used in the same way as the embodiments shown in FIGS. 1 and 4 are used. However, the FIG. 6 embodiment allows the added flexibility of changing the timing by changing both the valve's opening and closing angles as well as the duration (a.k.a. "dwell") of the opening and closing.

When combined with a concentric camshaft embodiment as shown in FIG. 8, the dual-acting phasing mechanism of the present invention can be employed in complex multi-camshaft arrangements with varying degrees of freedom for changing relative timing of valves with respect to each other and with respect to the engine timing set by the timing of the crankshaft which drives the camshafts. In addition, the dwell of the valve events can be changed by using a cam 21 splittable into camlobes 28, 36 such as shown in FIGS. 4 and 6 for example in place of the moveable cam member 27 shown in FIGS. 1, 2, and 8 for example.

In each of FIGS. 1, 2, 4, and 8–17, the designating numeral 79 indicates an embodiment of the dual-acting phasing mechanism of the present invention. Each four-element embodiment (FIGS. 2, 3, 8 and 12 for example) of the dual-acting phasing mechanism 79 includes three internally splined members 40, 50, and 60, respectively, and an externally splined first flexible member 70 as explained above. Each five-element embodiment (FIGS. 14 and 15 for example) of the dual-acting phasing mechanism 79 includes three internally splined members 40, 50, 60, respectively, an externally splined first flexible member 70 and an externally splined second flexible member 170 as explained above. Each six-element embodiment (FIGS. 16 and 17 for example) of the dual-acting phasing mechanism 79 includes four internally splined members 40, 50, 60 and 160, respectively, an externally splined first flexible member 70 and an externally splined second flexible member 170 as explained above. The five-element and six-element embodiments of the dual-acting phasing mechanism 79 of the present invention, can be used for all of the engine applications described herein.

Figure 9:
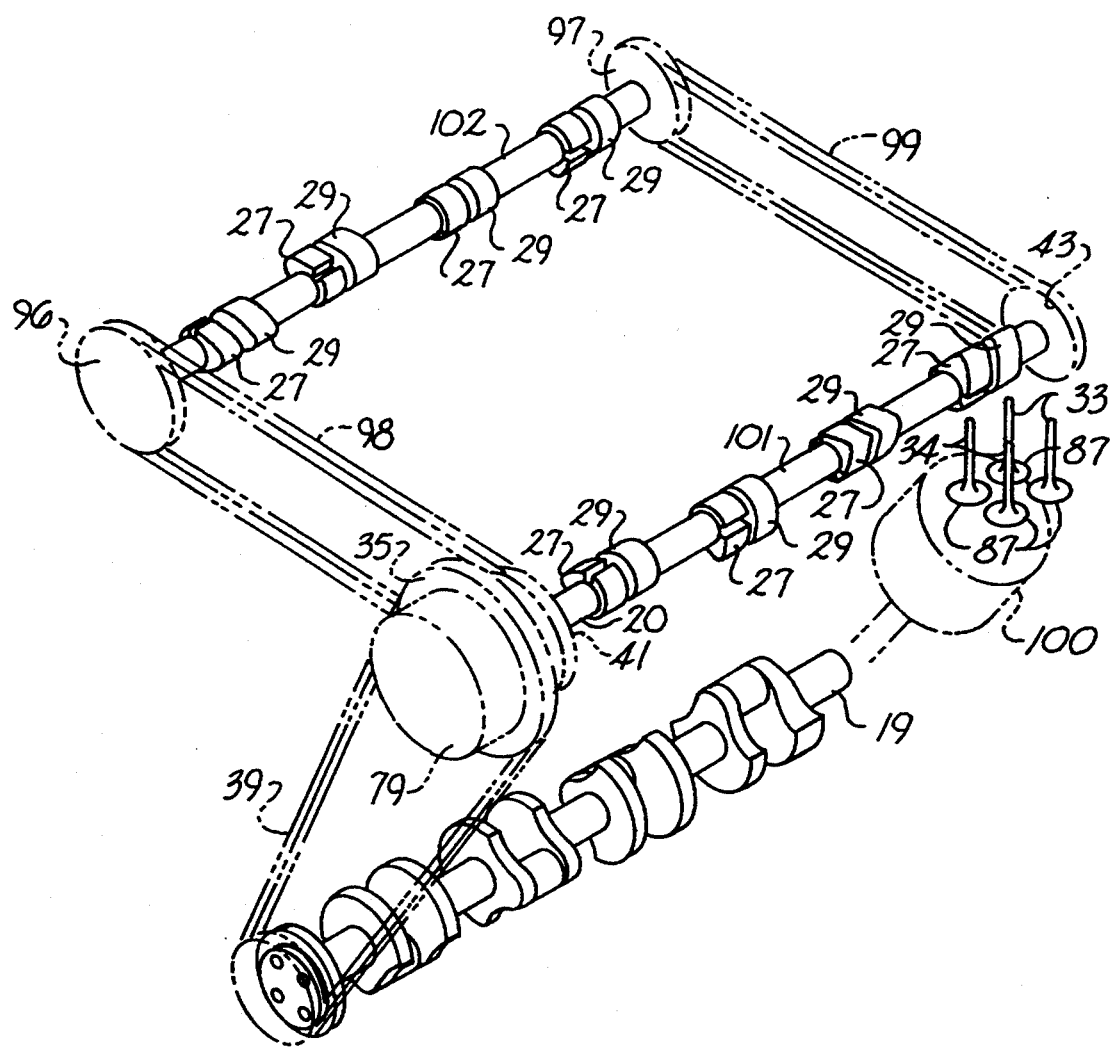
FIG. 9 schematically illustrates an elevated perspective view of an embodiment of the present invention in a multiple shaft arrangement of concentric camshafts.

As shown schematically in FIGS. 8 and 9, one end of outer shaft 20 is configured with a first (or outer shaft) pulley wheel 41. As shown schematically in FIG. 8, the end of inner shaft 24 that is opposite the end connected to inner shaft collar 44, is nonrotatably connected to a second (or inner shaft) pulley wheel 43. The inner shaft pulley wheel 43 can be nonrotatably fixed to the end of inner shaft 24 by any of a number of means known to those skilled in the art. As shown in FIG. 8 for example, a key 92 and keyway 93 mechanism is provided together with a bolt 94 and washer 95 mechanical attachment.

In the embodiment schematically shown in FIG. 9, a first concentric camshaft 101 is provided and configured as illustrated in FIG. 8 for example. As depicted in FIG. 9, first concentric camshaft 101 is provided with moveable cam members 27 and fixed cam members 29. However, other arrangements of cam members, whether splittable 21, fixed 29 or moveable 27, can be provided. For example, other configurations of moveable and fixed camlobe members 28, 36 such as shown in FIG. 4 can be provided in place of moveable cam members 27 or fixed cam members 29. As schematically shown in FIG. 9, a second concentric camshaft 102 is provided and configured as disclosed in one or more of U.S. Pat. Nos. 4,770,060; 4,771,742; 4,917,058; 5,136,887; and 5,161,429, the disclosures of each of the foregoing patents being hereby incorporated herein by this reference.

In still further accordance with the present invention, a means can be provided for driving rotation of a second camshaft in phase with a first concentric camshaft. The second camshaft driving means is connected to engage at least one of the outer shaft and the inner shaft of the first concentric camshaft. As embodied herein and shown in FIG. 9 for example, the second camshaft driving means includes outer shaft belt or chain 98 and a third pulley wheel 96 attached to one end of the outer shaft of concentric camshaft 102. Pulley wheel 96 has the same diameter as outer shaft pulley wheel 41 of first concentric camshaft 101. Outer shaft belt or chain 98 rotatably connects third pulley wheel 96 of second concentric shaft 102 with outer shaft pulley wheel 41 of first concentric shaft 101. The second camshaft driving means can also or alternatively include an inner shaft belt or chain 99 and a fourth pulley wheel 97. As shown in FIG. 9 for example, opposite to the end of second concentric camshaft 102 with third pulley wheel 96, camshaft 102 is provided with a fourth pulley wheel 97 attached to the inner shaft of second concentric camshaft 102. Fourth pulley wheel 97 has the same diameter as inner shaft pulley wheel 43 of first concentric camshaft 101. Inner shaft belt or chain 99 rotatably connects fourth pulley wheel 97 of second concentric shaft 102 with inner shaft pulley wheel 43 of first concentric shaft 101. A crankshaft belt or chain 39 connects crankshaft 19 with timing pulley wheel 35 of first concentric shaft 101 via dual-acting phasing mechanism 79.

The engine configuration shown in FIG. 9 can be employed in a multi-valve V-8 engine in which first concentric shaft 101 and second concentric shaft 102 are both intake camshafts or both exhaust camshafts of a V-8 engine. Similar arrangements can be used for engines having other numbers of cylinders (e.g., 3, 4, 5, 6, 10 or 12 cylinders). One cylinder 100 of the engine is schematically depicted in dashed line and is provided with two valves 89 which are actuated by first concentric shaft 101. One of the valves 89 of cylinder 100 is actuated by moveable cam member 27, and the other of the valves 89 is actuated by fixed cam member 29 of first concentric camshaft 101. Thus, the timing of one of the valves 89 of cylinder 100 can be advanced or retarded relative to the timing of the adjacent valve 89 of cylinder 100. The same change in timing is effected for each of the eight cylinders by the control of dual-acting phaser 79 because of the dynamic linkage provided by first and second belts 98, 99 between first and second concentric camshafts 101, 102. This type of timing change affects the "dwell," because this type of timing change varies the length of time during which the engine's breathing process, whether induction or exhaust, occurs. Thus, a similar arrangement can be provided whether the camshafts are exhaust camshafts or intake camshafts.

In the embodiment shown in FIG. 9, the timing of the valves actuated by first concentric camshaft 101 and the timing of the valves actuated by second concentric camshaft 102 are both changed by the same amount with respect to the timing of crankshaft 19. Thus, if the timing of the valves actuated by moveable cam member 27 of first concentric camshaft 101 is changed by a certain amount with respect to the timing of crankshaft 19, then the timing of the actuation of the valves actuated by moveable cam member 27 of second concentric camshaft 102, is likewise changed by the same amount with respect to the timing of crankshaft 19. Similarly, if the timing of the valves actuated by fixed cam member 29 of first concentric camshaft 101 is changed by a certain amount with respect to the timing of crankshaft 19, then the valves actuated by fixed cam member 29 of second concentric camshaft 102 is likewise changed by the same amount with respect to the timing of crankshaft 19.

Figure 10:
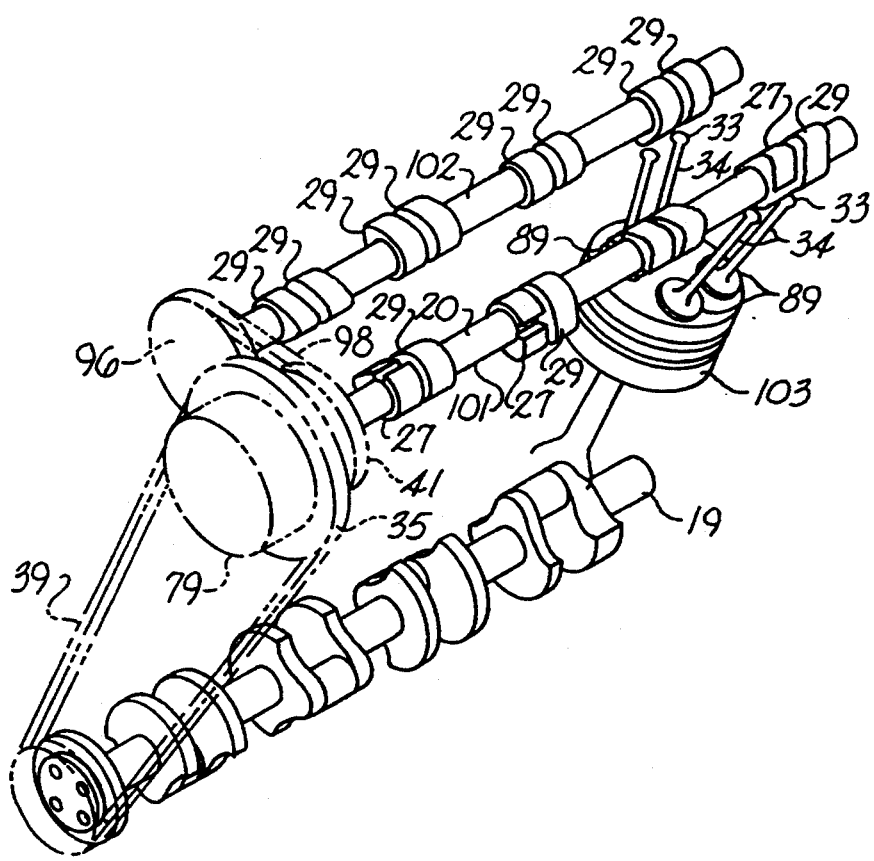
FIG. 10 schematically illustrates an elevated perspective view of another embodiment of the present invention in an arrangement of multiple camshafts.

FIG. 10 shows an embodiment arranged similarly to that of FIG. 9 except that second concentric camshaft 102 is only provided with fixed cam members 29 and could be a conventional camshaft rather than a concentric camshaft. Accordingly, the FIG. 10 embodiment also dispenses with the second (inner shaft) pulley wheel 43, fourth pulley wheel 97, and inner shaft chain or belt 99. Third pulley wheel 96 is connected by a chain or belt 98 to outer shaft pulley wheel 41 connected to the outer shaft 20 of first concentric camshaft 101, which can be configured as shown in FIG. 8 with a four-element embodiment of phaser 79 or as shown in FIG. 16 with a six-element embodiment of phaser 79. The FIG. 10 configuration can be used with a single bank of a V-8 engine with multiple valves or with a four-cylinder engine with multiple valves. Similar arrangements can be made for engines having other numbers of cylinders (e.g., 3, 5, 6, 10 or 12 cylinder engines). Both two-valve and multi-valve arrangements can make use of this technology. If provided for a single valve bank of a V-8 engine, dual-acting phasing mechanism 79 permits one of the valves 89 of each cylinder served by a piston 103 to be advanced or retarded relative to the timing of the adjacent valve actuated by first concentric camshaft 101. The two valves 89 actuated by second camshaft 102 and serving piston 103 are timed identically as the valve 89 actuated by fixed cam member 29 of first concentric camshaft 101 serving piston 103.

Figure 11:
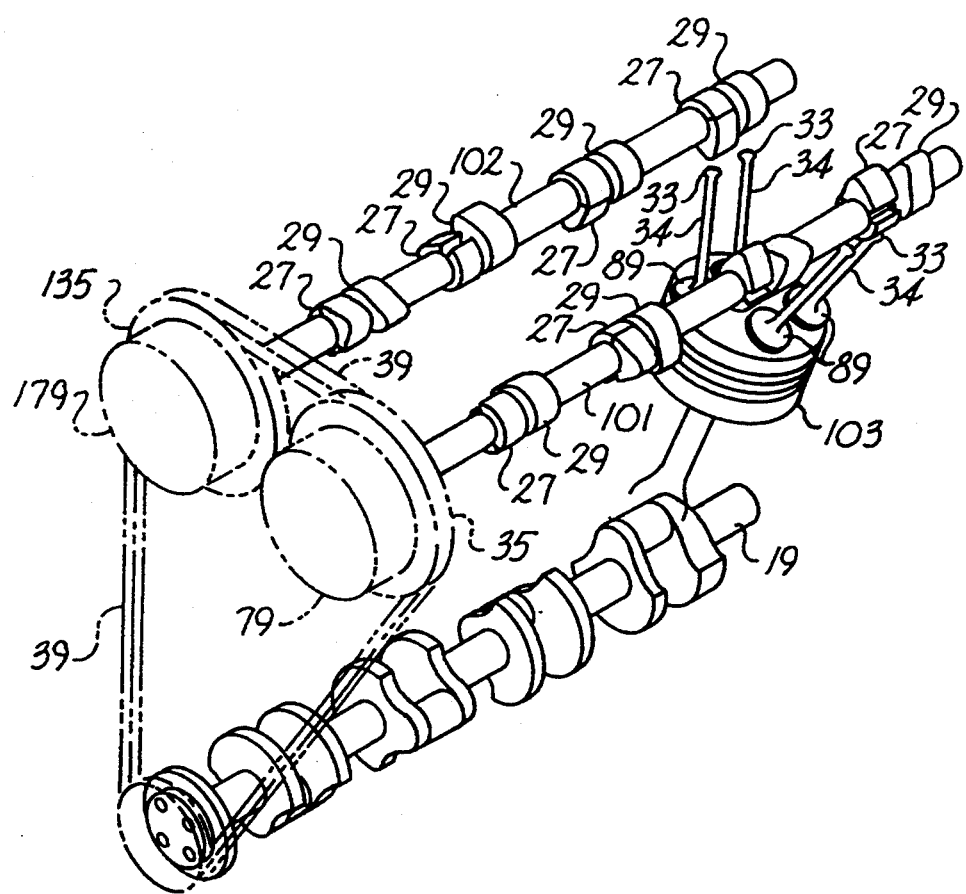
FIG. 11 schematically illustrates an elevated perspective view of yet another embodiment of the present invention in a multiple shaft arrangement of concentric camshafts.

In the embodiment shown in FIG. 11, a first concentric camshaft 101 has a dual-acting phasing mechanism 79 configured in accordance with the present invention. A second concentric camshaft 102 has a second dual-acting phasing mechanism 179 configured in accordance with the present invention. Moreover, second concentric camshaft 102 is provided with a timing pulley wheel 135 that is configured as pulley wheel 35 shown in FIGS. 1–3 for example. A crankshaft chain or belt 39 engages timing pulley wheel 35 of first concentric camshaft 101 and timing wheel 135 of second concentric camshaft 102 to drive both of them in timed relationship with crankshaft 19. Thus, both first concentric camshaft 101 and second concentric camshaft 102 are identically configured as shown in FIG. 1 or 4 for example. Configured as shown in FIG. 11, provision of the second dual-acting phasing mechanism 179 permits valve timing optimization as a result of both the moveable cam members 27 and the fixed cam members 29 of second concentric camshaft 102 being phased in a similar manner to, but independent of, the phasing of the moveable cam members 27 and fixed cam members 29 of first concentric camshaft 101. Thus, each of the four valves serving piston 103 can be independently timed relative to each of the other three valves serving piston 103. This is the case when both of the first and second dual-acting phasing mechanisms are either five-element or six-element embodiments. However, if the four-element phasing mechanism (with its single wave generator 80) is used, the action of the cam members on a given camshaft will be dependent, even though the magnitudes of angular shift may be different.

The internally splined members of a dual-acting phaser embodiment can be configured so that the embodiment shown in FIG. 11 has the capability of changing the timing of the valves actuated by second concentric camshaft 102 with respect to the valves actuated by first concentric camshaft 101. With a somewhat different configuration of the internally splined members, the timing of the valves actuated by each of first concentric shaft 101 and second concentric shaft 102 can be changed with respect to the crankshaft 19. For example, the desired timing of two sets of valves can be achieved by designating the number of splines for the internally splined members in the dual-acting phasing mechanism 79 attached to camshaft 101 (one set is actuated by the adjustable camlobes and the other set by the fixed camlobe). Similarly, the timing of sets of valves can be achieved by designating the number of splines for internally splined members in the dual-acting phasing mechanism 179 attached to camshaft 102.

It is noted that the adjustable camlobes of the concentric camshafts shown in FIGS. 9, 10 and 11 can be splittable camlobes such as shown in FIG. 4. The above description of the action of the camlobes resulting from phaser operation, applies equally as well with splittable camlobes 21 as with full-width lobes 27, 29.

FIG. 12 illustrates the use of a four-element dual-acting phasing mechanism 79 in connection with a solid conventional camshaft 25. Timing pulley wheel 35 (shown in dashed line) is connected to dual-acting phasing mechanism 79 (shown in dashed line) by a third internally splined member, which is not outlined separately in FIG. 12's dashed line outline of dual-acting phasing mechanism 79. An outer shaft collar 151 is connected to second internally splined member 50 (indicated in dashed outline) and is configured with a pulley wheel 141 that is free to rotate with respect to solid camshaft 25. An inner shaft collar 144 is connected to a first internally splined member 40 (indicated in dashed outline). As schematically shown in FIG. 12, inner shaft collar 144 has a section that is H-shaped when depicted in cross-section. The left-hand portion of the H-shaped section of collar 144, receives a journal 104 of solid camshaft 25. A threaded bolt 105 is screwed through the middle section 106 of the H-shaped portion of collar 144 and into a threaded bore 107 disposed longitudinally into the end of solid camshaft 25 so that solid camshaft 25 is held nonrotatably with respect to inner shaft collar 144. This embodiment is applicable, for example, for valve-overlap-angle control, in which case a single dual-acting phaser can operate to control the overlap angle for an engine having dual camshafts (intake and exhaust shafts) by adjusting simultaneously the timing of valves controlled by both shafts. This provides an extra degree of control as compared with the situation wherein a single-acting phaser changes the phase angle of only one of the shafts. The four-elements phaser provides two mutually dependent adjustments while each of the five-element and six-element phasers provides two independent adjustments.

Figure 13:
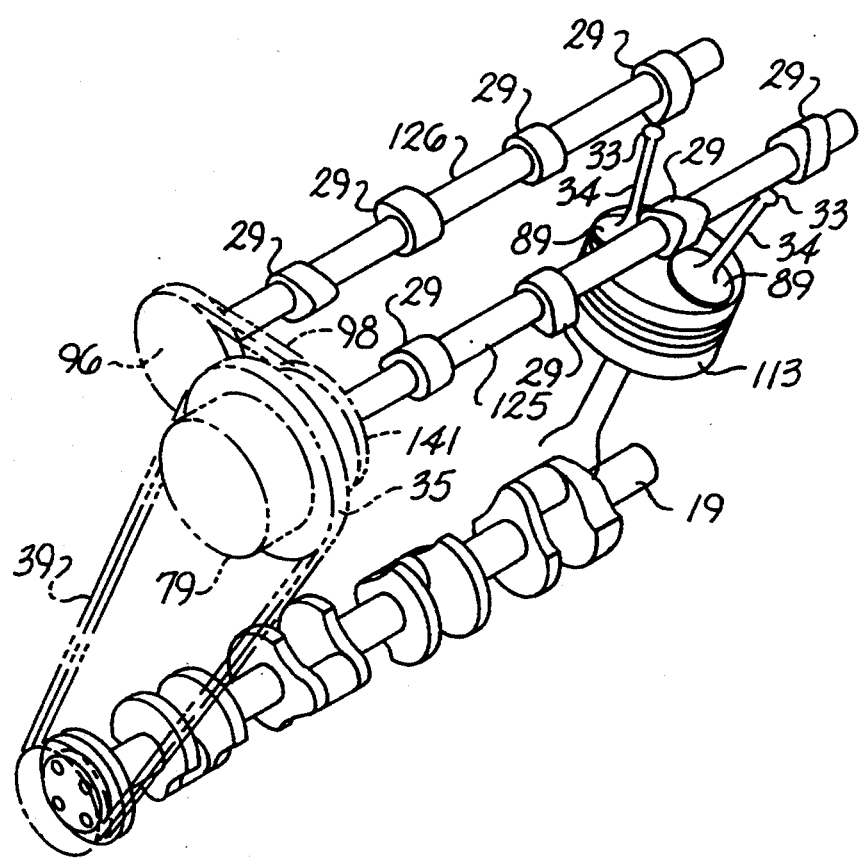
FIG. 13 schematically illustrates an elevated perspective view of still another embodiment of the present invention in a multiple shaft arrangement of conventional camshafts.

As schematically shown in FIG. 13, a first solid camshaft 125 is configured to be connected to dual-acting phasing mechanism 79 in the same manner as solid camshaft 25 shown in FIG. 12. A second solid camshaft 126 is provided with a pulley wheel 96 connected to pulley wheel 141 via a shaft chain or belt 98. A crankshaft belt or chain 39 connects pulley wheel 35 to crankshaft 19. The FIG. 13 configuration can be used with any double-overhead-cam engine. Two-valve or multi-valve applications are possible. Dual-acting phasing mechanisms 79, arranged as shown in FIGS. 12 and 13, permit the timing of either one or both of the conventional camshafts to be advanced or retarded relative to the timing of the crankshaft 19. The number of splines on the internally splined members 40, 50, 60 and externally splined member 70 can be selected to achieve the desired operating characteristics of the engine.

In accordance with a method of the present invention for variable valve timing of an engine having at least one camshaft, a crankshaft is used to drive a first camshaft which cyclically actuates at least one valve of at least one cylinder of an internal combustion engine. As shown in FIG. 9, a crankshaft 19 is used to drive a first camshaft 101 which cyclically actuates at least one valve 89 of at least one cylinder 100 of an internal combustion engine. As shown in FIGS. 10 and 11, a crankshaft 19 is used to drive a first camshaft 101 which cyclically actuates at least one valve 89 of at least one cylinder served by a piston 103 of an internal combustion engine. As shown in FIG. 13, a crankshaft 19 is used to drive a first camshaft 125 which cyclically actuates at least one valve 89 of at least one cylinder served by a piston 113 of an internal combustion engine. The method can further include the use of a first dual-acting phasing mechanism to control the timing of valve events that are actuated by the first camshaft. As shown in each of FIGS. 9–11, a first dual-acting phasing mechanism 79 is used to control the timing of valve events actuated by a first concentric camshaft 101. As shown in FIG. 13, a dual-acting phasing mechanism 79 is used to control the timing of valve events actuated by a first concentric camshaft 125.

The method of the present invention also can include the use of a second camshaft to control the actuation of at least one other valve of the engine. As shown in FIGS. 9–11, a second camshaft 102 can be employed to control the actuation of at least one other valve of the engine. As shown in FIG. 13, a second camshaft 126 can be employed to control the actuation of at least one other valve of the engine. As shown in FIGS. 9–11 and 13, the crankshaft 19 drives the second camshaft through a series of pulley wheels and belts or chains.

In further accordance with the method, a second dual-acting phasing mechanism can be used to control the timing of valve events actuated by a second camshaft. As shown in FIG. 11 for example, a second dual-acting phasing mechanism 179 is provided on second camshaft 102 to control the timing of valve events actuated by second camshaft 102. As shown in FIG. 11, first dual-acting phasing mechanism 79 is rotatably connected to second dual-acting phasing mechanism 179 by pulley wheels 35, 135 and a belt or chain 39 driven by crankshaft 19. As shown in FIGS. 9–11, in the method the first camshaft 101 can be a concentric camshaft and second camshaft 102 also can be configured as a concentric camshaft. As shown in FIG. 9 for example, a first pulley wheel 41 can be configured as part of first dual-acting phasing mechanism 79 and attached to the outer shaft of first camshaft 101 to drive second camshaft 102 via belt or chain 98 and pulley wheel 96. In this way, the cams 29 attached to the outer shaft of first camshaft 101 are driven synchronously with the cams 29 of second camshaft 102 so that the valves respectively actuated by such cams on each camshaft 101, 102 are synchronously actuated with each other. As shown in FIG. 9, a second pulley wheel 43 attached to the inner shaft of first camshaft 101 is attached by a chain or belt 99 to a fourth pulley wheel 97 attached to the inner shaft of second camshaft 102 to synchronize the operation of the inner shaft of second camshaft 102 with the operation of the inner shaft of first camshaft 101.

What is claimed is:

1. An apparatus driven by a drive means about an axis of rotation to effect the cyclical actuation of an actuation member, the apparatus comprising:
   a first internally splined member, said first internally splined member defining a first circularly cylindrically configured interior surface, said first interior surface defining a plurality of splines, said first internally splined member being configured and disposed for rotating about said axis;
   a means for linking said first internally splined member for rotation about said axis in phase with a first rotatable member;
   a second internally splined member, said second internally splined member defining a second circularly cylindrically configured interior surface, said second interior surface defining a plurality of splines, said second internally splined member being configured and disposed for rotating about said axis;
   a means for linking said second internally splined member for rotation about said axis in phase with a second rotatable member;
   a third internally splined member, said third internally splined member defining a third circularly cylindrically configured interior surface, said third interior surface defining a plurality of splines, said third internally splined member being configured and disposed for rotating about said axis;
   a means for linking said third internally splined member for rotation about said axis in phase with a means for engaging the drive means;
   a first cylindrically configured flexible member, said first flexible cylindrical member defining a splined outer surface, said first flexible cylindrical member being flexible enough so as to be elastically deformable from said first flexible cylindrical member's unflexed transverse shape, said first flexible cylindrical member being rotatably disposed about said axis and at least partially within each internally splined member of at least a first pairing of two of said first, second, and third internally splined members; and
   a first wave generator disposed rotatably within said externally splined flexible cylindrical member, said first wave generator being configured with an approximately elliptical transverse cross-sectional shape that deforms said first flexible cylindrical member sufficiently so that said splined outer surface of said first flexible cylindrical member nonrotatably engages each of said respective splined interior surfaces of said internally splined members of said first pairing of said first, second and third internally splined members at both ends of the major axis of symmetry of said approximately elliptical first wave generator.

2. An apparatus as in claim 1, further comprising:
   a control means for imparting a controlled relative rotation between selective ones of said internally splined members.

3. An apparatus as in claim 2, wherein said control means includes at least one electric motor.

4. An apparatus as in claim 3, wherein said control means includes at least one electronic control unit connected in electrical communication with said electric motor to control operation of said electric motor.

5. An apparatus as in claim 4, wherein said control means includes at least one sensor connected to provide signals to said at least one electronic control unit.

6. Am apparatus as in claim 1, further comprising:
   a second cylindrically configured flexible member, said second flexible cylindrical member defining a splined outer surface, said second flexible cylindrical member being flexible enough so as to be elastically deformable from said second flexible cylindrical member's unflexed transverse shape, said second flexible cylindrical member being rotatably disposed about said axis and at least partially within each said internally splined member of a second pairing of two of said first, second and third internally splined members; and
   a second wave generator disposed rotatably within said second externally splined flexible cylindrical member, said second wave generator being configured with an approximately elliptical transverse cross-sectional shape that deforms said second flexible cylindrical member sufficiently so that said splined outer surface of said flexible cylindrical member nonrotatably engages each of said respective splined interior surfaces of said internally splined members of said second pairing of said first, second and third internally splined members at both ends of the major axis of symmetry of said second approximately elliptical wave generator.

7. An apparatus as in claim 6, further comprising:
   a fourth internally splined member, said fourth internally splined member defining a fourth circularly cylindrically configured interior surface, said fourth interior surface defining a plurality of splines, said fourth internally splined member being configured and disposed for rotating about said axis;
   a means for linking said fourth internally splined member with one of said first, second and third internally splined members for rotation about said axis;
   wherein said second cylindrically configured flexible member is rotatably disposed about said axis and at least partially within each of two of said first, second, third and fourth internally splined members; and
   wherein said second wave generator deforms said second flexible cylindrical member sufficiently so that said splined outer surface of said second flexible cylindrical member nonrotatably engages each of said respective splined interior surfaces of said two of said first, second, third and fourth internally splined members at both ends of the major axis of symmetry of said second approximately elliptical wave generator.

8. An apparatus as in claim 1, further comprising:
   said first rotatable member configured in the form of a first camshaft nonrotatably connected to said means for linking said first internally splined member for rotation about said axis in phase with said first rotatable member;
   said second rotatable member nonrotatably connected to said means for linking said second internally splined member for rotation about said axis in phase with said second rotatable member; and
   a means for engaging the drive means for rotating said first camshaft and said second rotatable member about said axis, said drive means engaging means being nonrotatably connected to said means for linking said third internally splined member for rotation about said axis in phase with said drive means engaging means.

9. An apparatus as in claim 8, wherein:
said first camshaft and said second rotatable member are concentrically disposed with respect to each other to define a concentric camshaft having an inner shaft and an outer shaft.

10. An apparatus as in claim 8, further comprising:
a control means for imparting a controlled relative rotation between said rotatable members and causing thereby a change in the timing of actuation of the actuation member in the actuating cycle while the drive means is rotating said rotatable members, said control means having at least a first output member being connected to said first wave generator, said first output member rotating said first wave generator relative to at least one of said rotatable members and about said axis and only during controlled relative rotation between said shafts, said controlled relative rotation between said rotatable members causing movement of said actuating means circumferentially about said axis.

11. An apparatus as in claim 8, further comprising:
a means for driving rotation of a second camshaft in phase with said first camshaft, said second camshaft driving means being connected to at least one of said first and second rotatable members.

12. An apparatus as in claim 11, further comprising:
a second camshaft; and
wherein said means for driving rotation of said second camshaft in phase with said first camshaft includes a first pulley wheel connected to one of said first and second rotatable members, said means for driving rotation of said second camshaft in phase with said first camshaft further includes a second pulley wheel connected to said second camshaft.

13. An apparatus as in claim 12, wherein:
said second camshaft defines a concentric camshaft including a second outer shaft and a second inner shaft, said second outer shaft defining a second cavity containing said second inner shaft; and
said means for driving rotation of said second camshaft in phase with said first camshaft includes a third pulley wheel connected to said first camshaft and a fourth pulley wheel connected to said second camshaft.

14. An apparatus as in claim 8, further comprising:
a second camshaft, said second camshaft being configured and disposed to operate in tandem with said first camshaft and rotate about a second rotational axis.

15. An apparatus as in claim 14, further comprising:
a second phasing mechanism, said second phasing mechanism being configured and connected to control said second camshaft; and
wherein said second camshaft is formed as a second concentric camshaft including:
a second outer shaft rotatable about a second axis of rotation, said second outer shaft defining a second cavity disposed along and around said second axis of rotation of said second outer shaft, and
a second inner shaft rotatably carried within said second cavity of said second outer shaft.

16. An apparatus as in claim 15, wherein:
said second phasing mechanism includes:
a fifth internally splined member, said fifth internally splined member defining a fifth circularly cylindrically configured interior surface, said fifth interior surface defining a plurality of splines, said fifth internally splined member being configured and disposed for rotating about said second rotational axis,
a means for linking said fifth internally splined member for rotation about said second rotational axis in phase with one of said second inner and outer shafts,
a sixth internally splined member, said sixth internally splined member defining a sixth circularly cylindrically configured interior surface, said sixth interior surface defining a plurality of splines, said sixth internally splined member being configured and disposed for rotating about said second rotational axis,
a means for linking said sixth internally splined member for rotation about said second rotational axis in phase with the other of said second inner and outer shafts,
a seventh internally splined member, said seventh internally splined member defining a seventh circularly cylindrically configured interior surface, said seventh interior surface defining a plurality of splines, said seventh internally splined member being configured and disposed for rotating about said second rotational axis,
a means for linking said seventh internally splined member for rotation about said second rotational axis in phase with said means for engaging the drive means,
a second cylindrically configured flexible member, said second flexible cylindrical member defining a splined outer surface, said second flexible cylindrical member being flexible enough so as to be elastically deformable from said second flexible cylindrical member's unflexed transverse shape, said second flexible cylindrical member being rotatably disposed about said second rotational axis and at least partially within each of at least two of said fifth, sixth, and seventh internally splined members, and
a second wave generator disposed rotatably within said externally splined second flexible cylindrical member, said second wave generator being configured with an approximately elliptical transverse cross-sectional shape that deforms said second flexible cylindrical member sufficiently so that said splined outer surface of said second flexible cylindrical member nonrotatably engages each of said respective splined interior surfaces of at least two of said fifth, sixth and seventh internally splined members at both ends of the major axis of symmetry of said approximately elliptical second wave generator.

17. An apparatus driven by a drive means to effect the cyclical actuation of an actuation member, the apparatus comprising:
a first camshaft, said first camshaft having a longitudinal axis of rotation;
a first dual-acting phasing mechanism having at least three internally splined members, each of said three internally splined members being individually rotatable about said axis of rotation, at least one of said three internally splined members being nonrotatably connected to said first camshaft; and a first pulley wheel, said first pulley wheel being nonrotatably connected to at least a second one of said three internally splined members.

18. An apparatus as in claim 17, further comprising:
a second pulley wheel, said second pulley wheel being nonrotatably connected to at least a third one of said three internally splined members.

19. An apparatus as in claim 18, further comprising:
a second camshaft;
a third pulley wheel nonrotatably carried by said second camshaft for driving same; and
a first flexible continuous loop member engaging said third pulley wheel with one of said first and second pulley wheels so that said two engaged pulley wheels rotate in phase with each other.

20. An apparatus as in claim 19, further comprising:
a fourth pulley wheel nonrotatably carried by said second camshaft for driving same;
a fifth pulley wheel nonrotatably carried by said first camshaft for driving same about said axis of rotation;
a second flexible continuous loop member engaging said fourth pulley wheel with the other of said first and said second pulley wheels so that said fourth pulley wheel rotates in phase with the other of said first and second pulley wheels;
a third flexible continuous loop member engaging said fifth pulley wheels so that said first, second and fifth pulley wheels rotate in phase with each other; and
wherein each of said first and second camshafts is a concentric camshaft.

21. An apparatus as in claim 17, further comprising:
a second camshaft;
a second pulley wheel nonrotatably carried by said second camshaft;
a flexible continuous loop member engaging said first and second pulley wheels so that said first and second pulley wheels rotate in phase with each other;
a second dual-acting phasing mechanism having at least one member non-rotatably connected to said second camshaft; and
wherein each of said first and second camshafts is a concentric camshaft.

22. A method of variable valve timing of an engine having at least one camshaft and wherein a dual-acting phasing mechanism has the capability to control a first acting member relative to a reference member as well as the capability to control a second acting member relative to the reference member and independently the first acting member, the method including the steps of:
using a crankshaft to drive a first camshaft which cyclically actuates at least one valve of at least one cylinder of an internal combustion engine;
using a first dual-acting phasing mechanism to control at least first valve event of said at least one valve actuated by said first camshaft and at least a second valve event so said at least one valve actuated by said first camshaft, wherein the control of each of said first and second valve events occurs independently of one another.

23. A method as in claim 22, further including the steps of:
using a second camshaft to control the actuation of at least one other valve of the engine; and
using said first dual-acting phasing mechanism to control the timing of the valve events actuated by the cams attached to both said camshafts.

24. A method as in claim 22, further including the steps of:
using said crankshaft to drive a second camshaft which cyclically actuates at least a second valve of at least one cylinder of the engine; and
using a second dual-acting phasing mechanism to control the timing of valve events actuated by said second camshaft.

25. A method as in claim 24, wherein:
said steps are performed with said first dual-acting phasing mechanism rotatably connected to said second dual-acting phasing mechanism and each of said first and second camshafts is configured as a concentric camshaft.

26. A method as in claim 22, wherein said first camshaft is configured to define a first concentric camshaft having an outer shaft and an inner shaft, the method further including the steps of:
using a second concentric camshaft to cyclically actuate at least one valve of at least one cylinder of the engine to control the timing of valve events actuated by said second concentric camshaft;
using a first pulley wheel which is connected to said first dual-acting phasing mechanism and attached to the outer shaft of said first concentric camshaft to drive said second concentric camshaft and synchronize the actuation of at least one valve actuated by at least one cam attached to said outer shaft of said second concentric camshaft with the actuation of at least one valve actuated by at least one cam attached to said outer shaft of said first concentric camshaft; and
using a second pulley wheel attached to the inner shaft of said first concentric camshaft and further attached by means of a chain or belt to a fourth pulley wheel attached to the inner shaft of said second concentric camshaft to synchronize the operation of said inner shaft of said second concentric camshaft with the operation of said inner shaft of said first concentric camshaft.

* * * * *